US012770921B2

(12) United States Patent
Jeong et al.

(10) Patent No.: US 12,770,921 B2
(45) Date of Patent: Oct. 20, 2026

(54) ADDITIVES FOR NONAQUEOUS ELECTROLYTE AND LITHIUM SECONDARY BATTERY CONTAINING THE SAME

(71) Applicant: LG Energy Solution, Ltd., Seoul (KR)

(72) Inventors: You Kyeong Jeong, Daejeon (KR); Kyoung Ho Ahn, Daejeon (KR); Junhyeok Han, Daejeon (KR); Won-Kyung Shin, Daejeon (KR); Wontae Lee, Daejeon (KR); Su Hyeon Ji, Daejeon (KR); Youngho Oh, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 928 days.

(21) Appl. No.: 17/983,896

(22) Filed: Nov. 9, 2022

(65) Prior Publication Data

US 2023/0155176 A1 May 18, 2023

(30) Foreign Application Priority Data

Nov. 16, 2021 (KR) ........................ 10-2021-0157225
Oct. 13, 2022 (KR) ........................ 10-2022-0131377

(51) Int. Cl.
*H01M 10/0567* (2010.01)
*H01M 4/02* (2006.01)
(Continued)

(52) U.S. Cl.
CPC ....... *H01M 10/0567* (2013.01); *H01M 4/386* (2013.01); *H01M 4/485* (2013.01);
(Continued)

(58) Field of Classification Search
CPC .. H01M 10/0567; H01M 4/386; H01M 4/485; H01M 4/505; H01M 4/525;
(Continued)

(56) References Cited

U.S. PATENT DOCUMENTS

2014/0272600 A1 9/2014 Bouchet et al.
2017/0058066 A1 3/2017 Hatakeyama et al.
(Continued)

FOREIGN PATENT DOCUMENTS

CN 109065951 A * 12/2018 ........ H01M 10/4235
CN 111670514 A 9/2020
(Continued)

OTHER PUBLICATIONS

JP-2000082494-A Translation (Year: 2000).*
(Continued)

*Primary Examiner* — Matthew T Martin
*Assistant Examiner* — Kevin Song
(74) *Attorney, Agent, or Firm* — Lerner David LLP

(57) ABSTRACT

An additive for a non-aqueous electrolyte, a non-aqueous electrolyte including the same, and a lithium secondary battery including the same are disclosed herein. The additive includes an ionic compound to form a coating film on an electrode surface, thereby preventing gas generation at high temperature, a cell open-circuit voltage (OCV) drop, and a decrease in capacity retention rate, which are caused by
(Continued)

elution of metal ions from an electrode. The additive improves durability, performance, and high temperature safety of the battery.

11 Claims, 5 Drawing Sheets

(51) Int. Cl.

| | |
|---|---|
| ***H01M 4/38*** | (2006.01) |
| ***H01M 4/485*** | (2010.01) |
| ***H01M 4/505*** | (2010.01) |
| ***H01M 4/525*** | (2010.01) |
| ***H01M 4/583*** | (2010.01) |
| ***H01M 10/0568*** | (2010.01) |
| ***H01M 10/0569*** | (2010.01) |
| ***H01M 50/46*** | (2021.01) |

(52) U.S. Cl.

CPC ........... *H01M 4/505* (2013.01); *H01M 4/525* (2013.01); *H01M 4/583* (2013.01); *H01M 10/0568* (2013.01); *H01M 10/0569* (2013.01); *H01M 50/46* (2021.01); *H01M 2004/027* (2013.01); *H01M 2004/028* (2013.01); *H01M 2300/0028* (2013.01)

(58) Field of Classification Search

CPC ............. H01M 4/583; H01M 10/0568; H01M 10/0569; H01M 50/46; H01M 2004/027; H01M 2004/028; H01M 2300/0028; H01M 4/483; H01M 4/587; H01M 2300/0025; H01M 10/0525; C07C 2601/14; C07C 311/48; Y02E 60/10

See application file for complete search history.

(56) References Cited

U.S. PATENT DOCUMENTS

| | | | |
|---|---|---|---|
| 2017/0204124 | A1 | 7/2017 | Takahashi et al. |
| 2021/0057780 | A1 | 2/2021 | Oh et al. |
| 2021/0257659 | A1 | 8/2021 | Park et al. |

FOREIGN PATENT DOCUMENTS

| | | | | | |
|---|---|---|---|---|---|
| CN | 111684643 | A | | 9/2020 | |
| DE | 102012209313 | A1 | * | 12/2013 | .......... H01M 4/9016 |
| JP | 2000082494 | A | * | 3/2000 | |
| JP | 2010225510 | A | | 10/2010 | |
| JP | 2017073251 | A | | 4/2017 | |
| JP | 2017122058 | A | | 7/2017 | |
| KR | 20140061501 | A | | 5/2014 | |
| KR | 20170021335 | A | | 2/2017 | |
| KR | 20210035646 | A | | 4/2021 | |
| KR | 20210095517 | A | | 8/2021 | |
| WO | 2012042005 | A1 | | 4/2012 | |
| WO | WO-2020060295 | A1 | * | 3/2020 | ........ H01M 10/0565 |

OTHER PUBLICATIONS

CN-109065951-A Translation (Year: 2018).*

DE-102012209313-A1 Translation (Year: 2013).*

Extended European Search Report including Written Opinion for Application No. 22895872.4 dated Jul. 11, 2024, pp. 1-7.

Communication pursuant to Article 94(3) EPC for European Application No. 22895872.4, dated Apr. 2, 2025, 4 pages.

Search Report dated May 22, 2026 from the Office Action for Chinese Application No. 202280007926.6 issued May 26, 2026, 3 pages.

* cited by examiner

【FIG. 1】
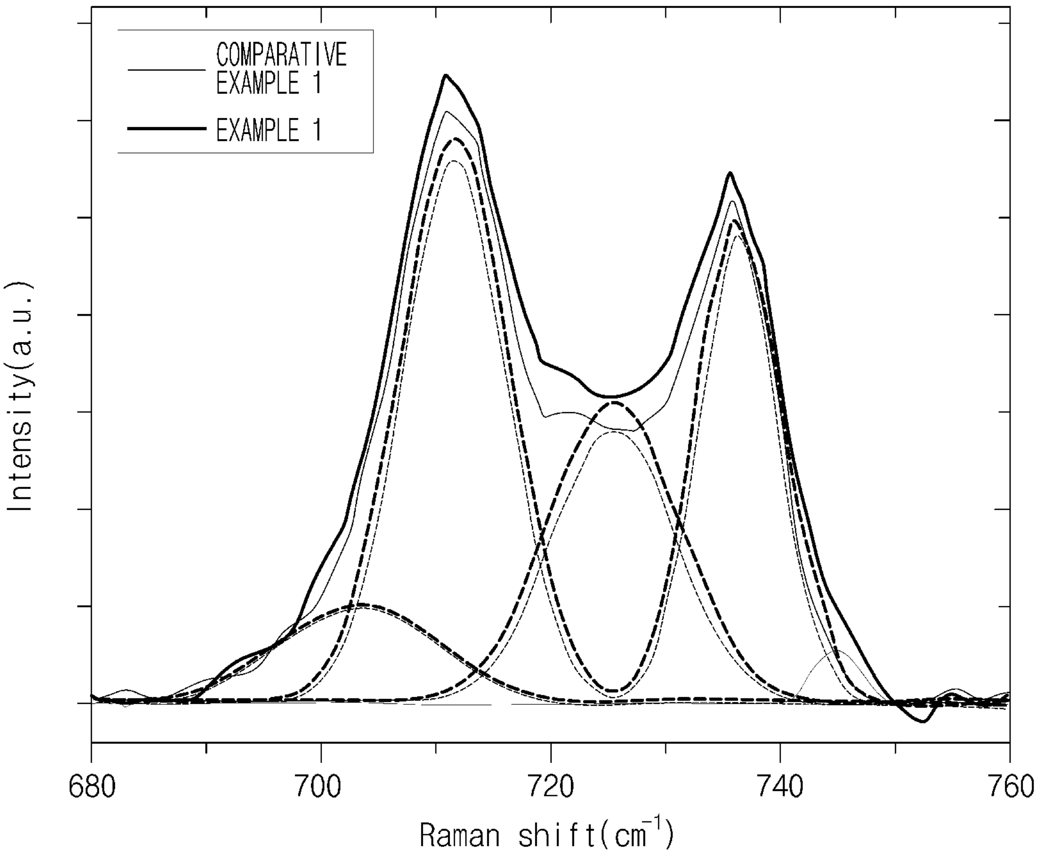

【FIG. 2】
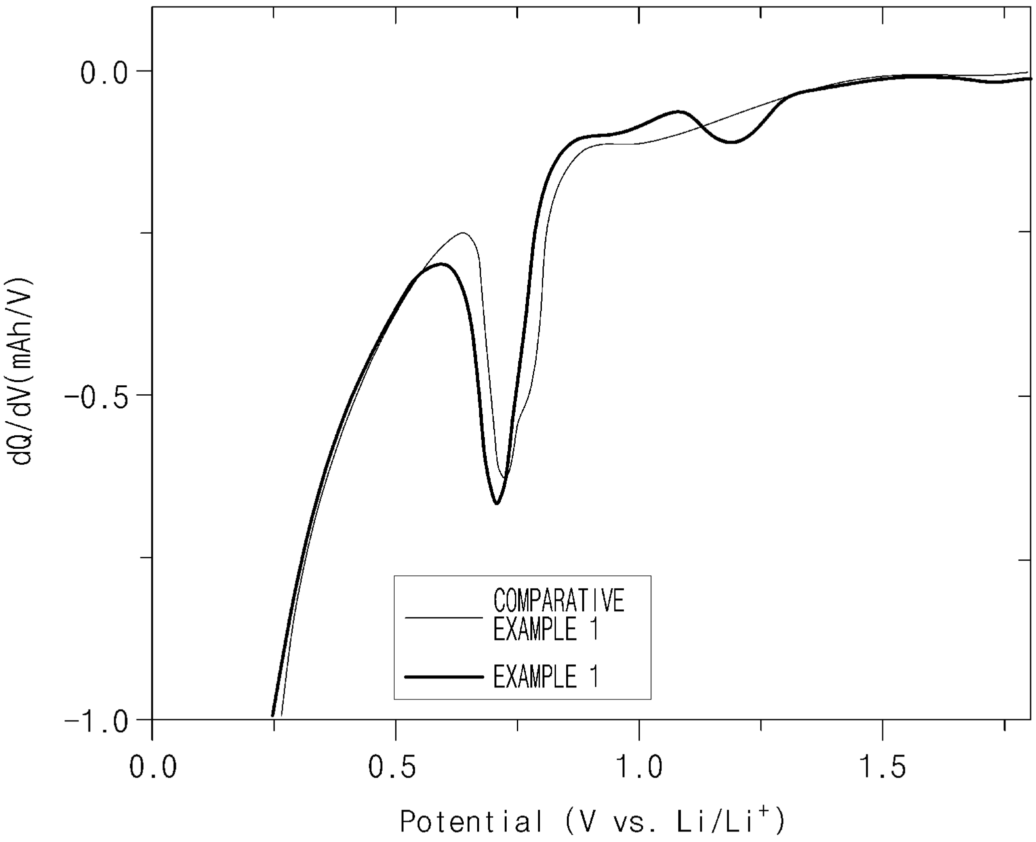

【FIG. 3】
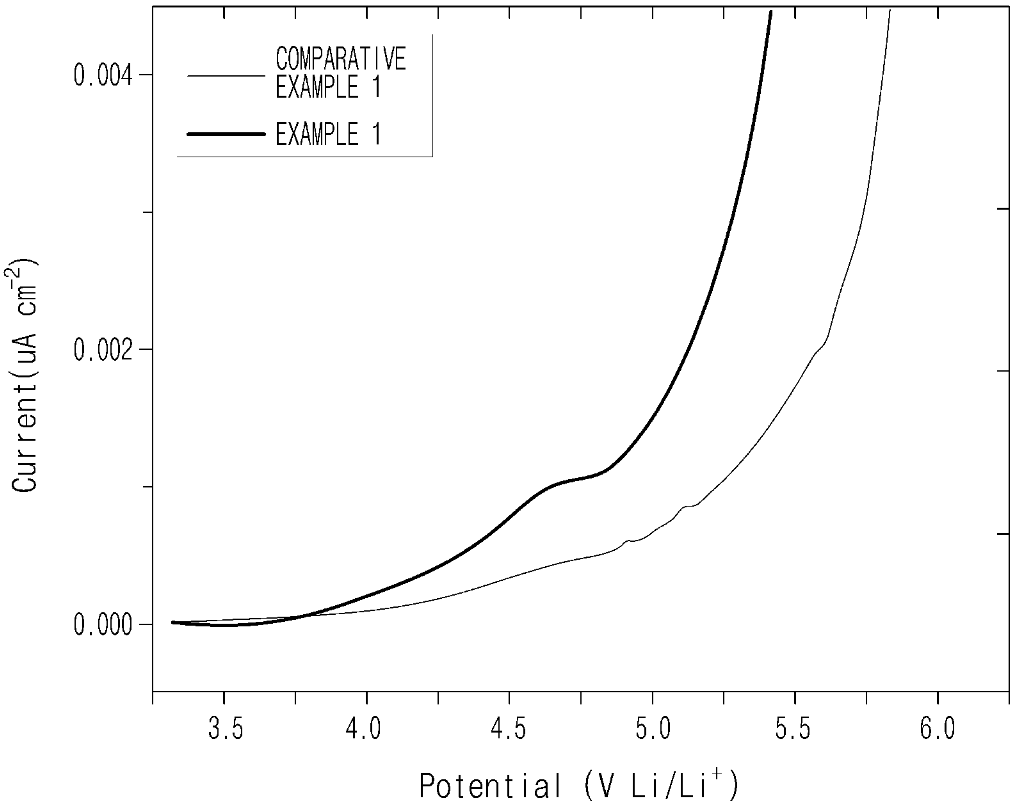

【FIG. 4A】
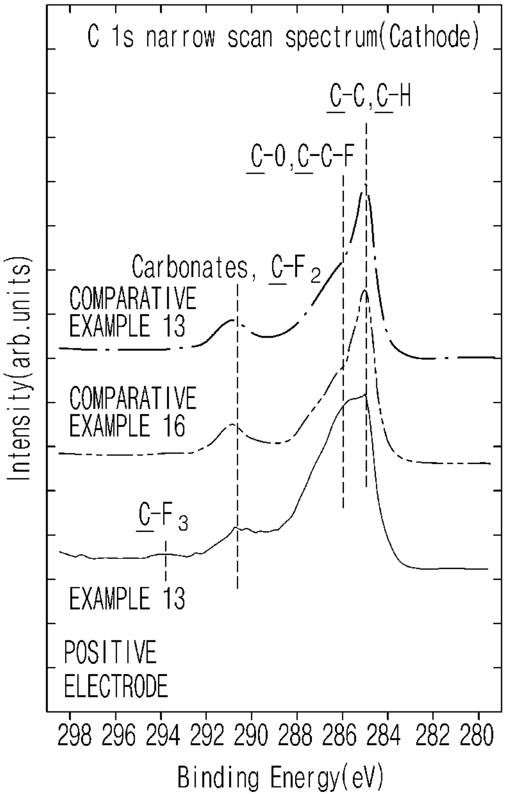
【FIG. 4B】
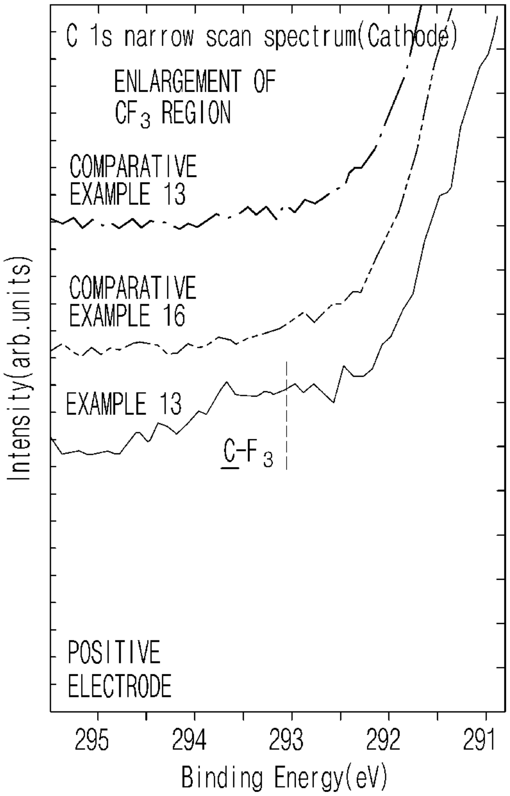

【FIG. 5A】
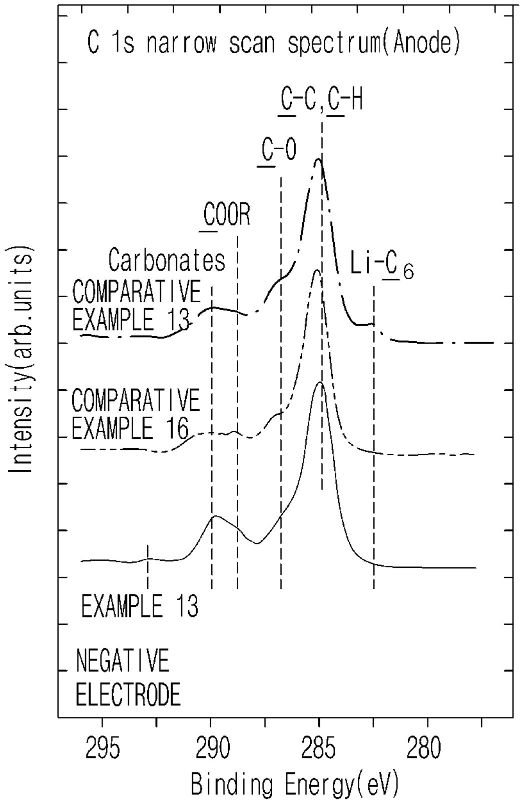
【FIG. 5B】
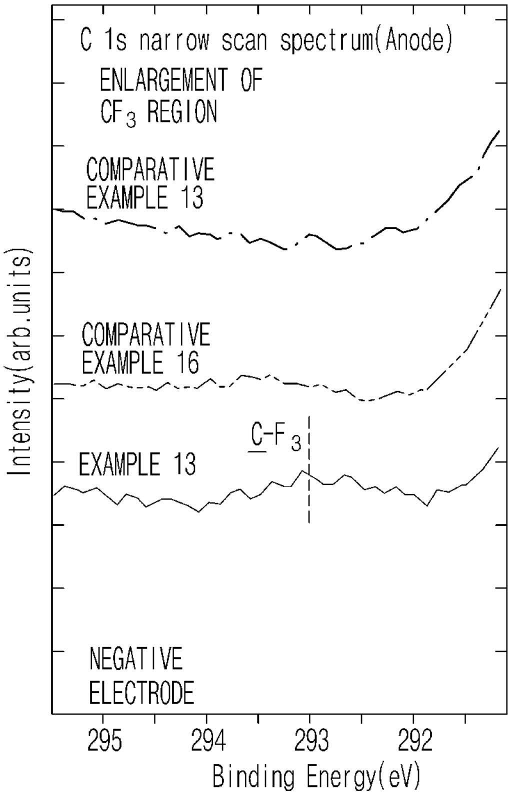

ADDITIVES FOR NONAQUEOUS ELECTROLYTE AND LITHIUM SECONDARY BATTERY CONTAINING THE SAME

CROSS-REFERENCE TO RELATED APPLICATIONS

This application claims priority from Korean Patent Application No. 10-2021-0157225, filed on Nov. 16, 2021, and Korean Patent Application No. 10-2022-0131377, filed on Oct. 13, 2022, the disclosures of which are incorporated by reference herein.

TECHNICAL FIELD

The present disclosure relates to a novel additive for a non-aqueous electrolyte and a lithium secondary battery including the same.

BACKGROUND

Recently, secondary batteries are widely applied not only to small devices such as portable electronic devices, but to medium and large devices such as battery packs or power storage devices of hybrid or electric vehicles. Examples of these secondary batteries may include non-aqueous electrolyte batteries such as lithium-ion batteries, lithium batteries, lithium-ion capacitors, and sodium ion batteries.

Among these non-aqueous electrolyte batteries, lithium-ion batteries are used by injecting an electrolyte into a battery cell including a positive electrode including a positive electrode active material that enables intercalation and deintercalation of lithium and a negative electrode including a negative electrode active material that enables intercalation and deintercalation of lithium. Particularly, an electrolyte uses an organic solvent in which a lithium salt is dissolved, and it is important to determine the stability and performance of a lithium secondary battery.

For example, $LiPF_6$, which is the most widely used lithium salt for an electrolyte, reacts with an electrolyte solvent to promote the depletion of the solvent and generate HF. The HF generated thereby may not only generate a large amount of gas under a high temperature condition, but also elute metal ions from a positive electrode active material, and when the eluted metal ions are generated in the form of a precipitate on the surface of a negative electrode, it causes an increase in potential of a negative electrode and a drop in cell open-circuit voltage (OCV), leading to problems such as degraded battery performance as well as a reduction in lifespan and high-temperature safety.

BRIEF SUMMARY

Technical Problem

Therefore, the present disclosure is directed to providing a developed technology of forming a coating film on an electrode surface to prevent direct contact between a positive electrode and an electrolyte, inhibit gas generation by lowering the oxidative decomposition of the electrolyte while blocking direct contact between the positive electrode and HF or $PF_5$, and improve a capacity retention rate and prevent the OCV drop of a battery by improving a metal ion precipitation phenomenon of the positive electrode.

Technical Solution

To solve the above-described problem, one embodiment of the present disclosure provides an electrolyte additive for a secondary battery, which includes a compound represented by Formula 1 below:

[Formula 1]

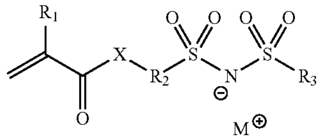

wherein, $R_1$ is hydrogen or an alkyl group having 1 to 4 carbon atoms, $R_2$ includes one or more selected from an alkylene group having 1 to 10 carbon atoms, an oxyalkylene group having 1 to 10 carbon atoms, a cycloalkylene group having 5 to 10 carbon atoms, and

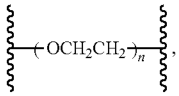, $R_3$ is a fluoro group, an alkyl group having 1 to 10 carbon atoms, an alkoxy group having 1 to 10 carbon atoms, or

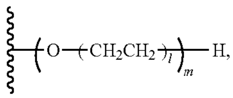, wherein one or more hydrogens included in the alkyl groups, the alkylene group, the alkoxy group, the oxyalkylene group, the cycloalkylene group,

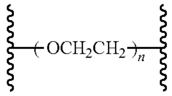 and 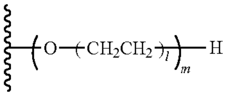

are optionally substituted with a fluorine atom,

X is an oxygen atom (O) or $—NR_4$, wherein $R_4$ is hydrogen or an alkyl group having 1 to 4 carbon atoms, M includes one or more selected from the group consisting of lithium, sodium, potassium, tetraalkyl ammonium having 1 to 4 carbon atoms, and tetraalkyl phosphonium having 1 to 4 carbons, l is an integer of 1 to 6, and each of m and n is an integer of 2 to 20.

Specifically, $R_1$ may be hydrogen or a methyl group, $R_2$ comprises one or more selected from a methylene group, an ethylene group, a propylene group, an oxymethylene group, an oxyethylene group, an oxypropylene group, a cyclobutylene group, a cyclopentylene group, a cyclohexylene group, a cycloheptylene group,

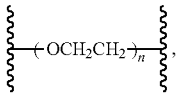, and 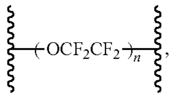, $R_3$ may be a fluoro group, a methyl group, an ethyl group, a propyl group, a methoxy group, an ethoxy group,

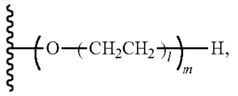 or 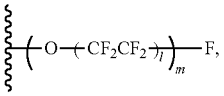

X may be an oxygen atom (O), —NH, or —$NCH_3$, M may be lithium, 1 may be an integer of 1 or 2, and each of m and n may be an integer of 2 to 10.

More specifically, the compound represented by Formula 1 may be one or more compounds selected from Structural Formula 1 to Structural Formula 120 below:

Structural Formula 1

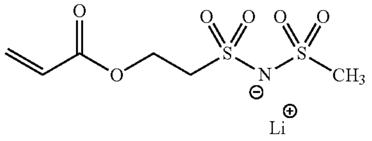

Structural Formula 2

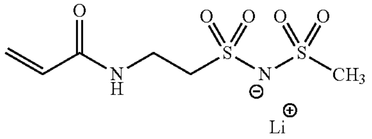

Structural Formula 3

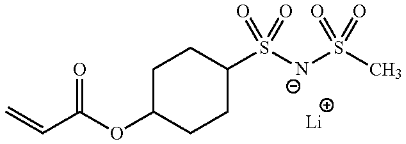

Structural Formula 4

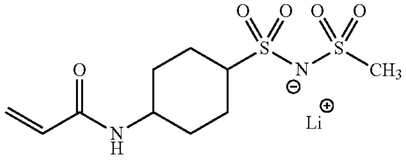

Structural Formula 5

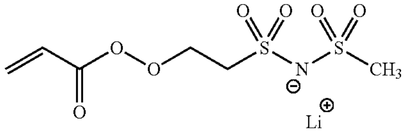

Structural Formula 6

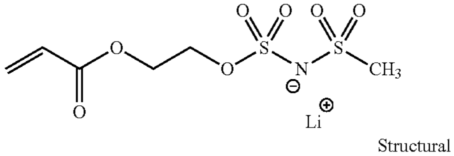

Structural Formula 7

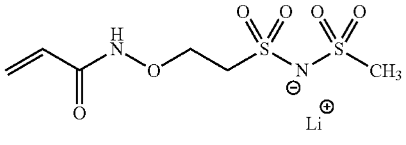

-continued

Structural Formula 8

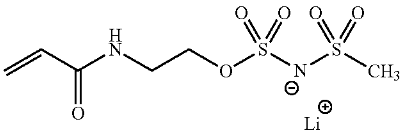

Structural Formula 9

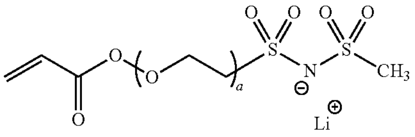

Structural Formula 10

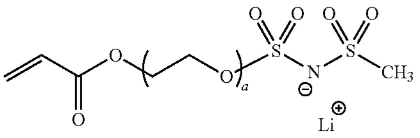

Structural Formula 11

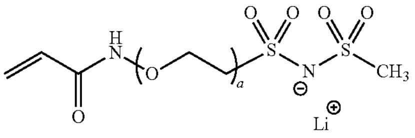

Structural Formula 12

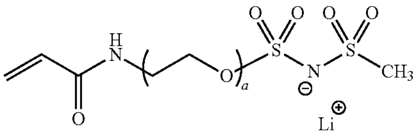

Structural Formula 13

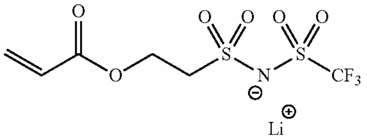

Structural Formula 14

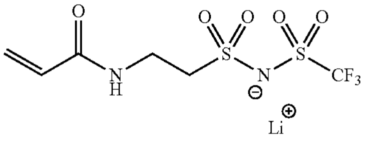

Structural Formula 15

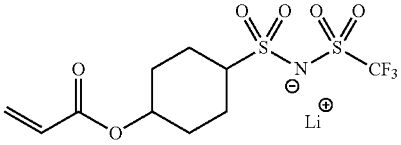

Structural Formula 16

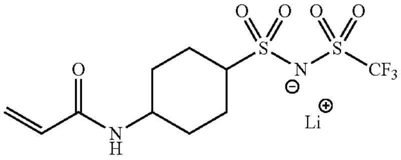

-continued

Structural Formula 17

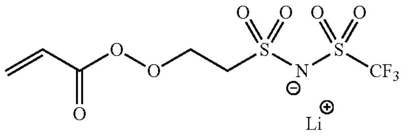

Structural Formula 18

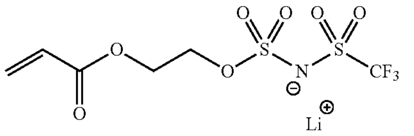

Structural Formula 19

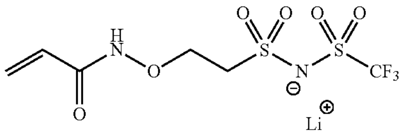

Structural Formula 20

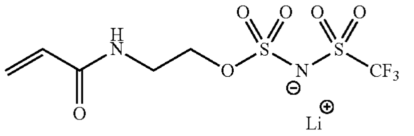

Structural Formula 21

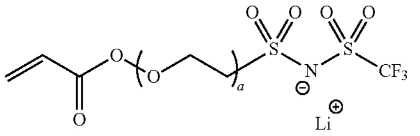

Structural Formula 22

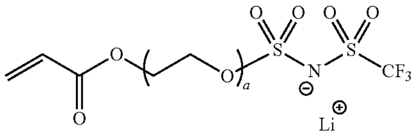

Structural Formula 23

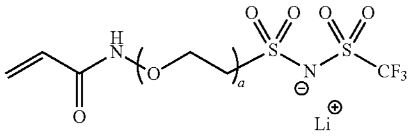

Structural Formula 24

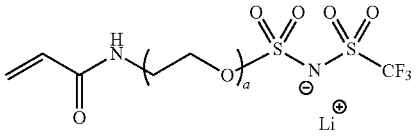

Structural Formula 25

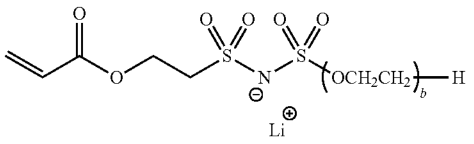

-continued

Structural Formula 26

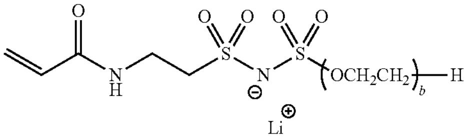

Structural Formula 27

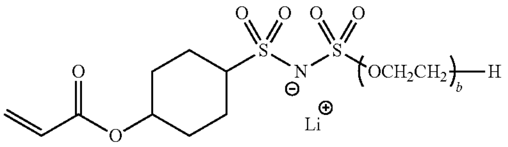

Structural Formula 28

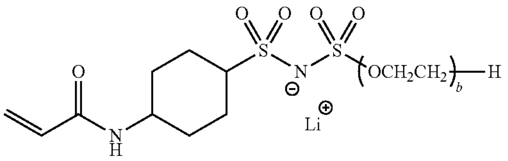

Structural Formula 29

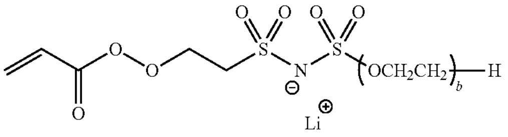

Structural Formula 30

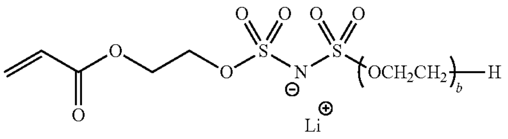

Structural Formula 31

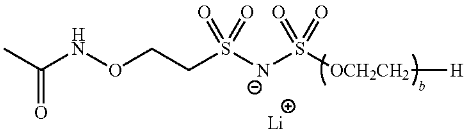

Structural Formula 32

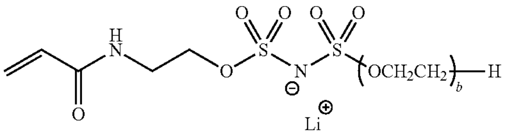

Structural Formula 33

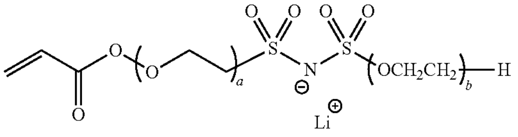

Structural Formula 34

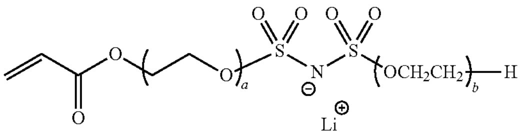

-continued

Structural Formula 35

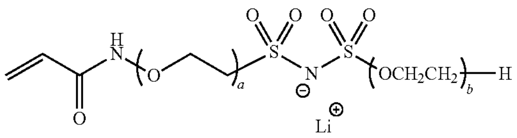

Structural Formula 36

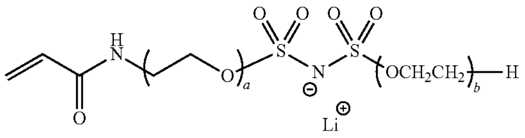

Structural Formula 37

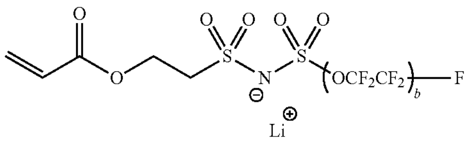

Structural Formula 38

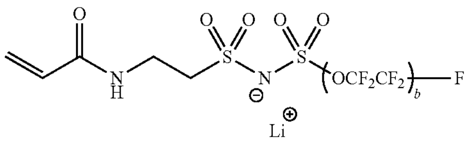

Structural Formula 39

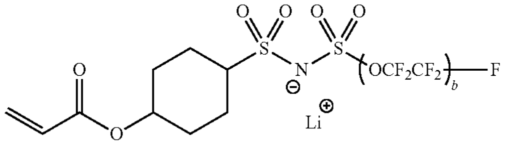

Structural Formula 40

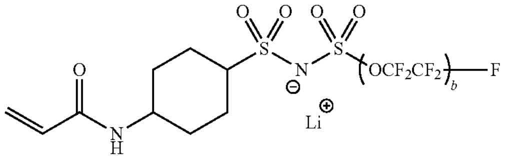

Structural Formula 41

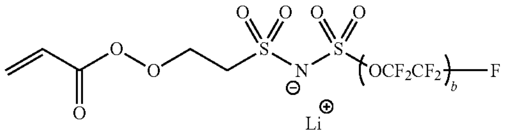

Structural Formula 42

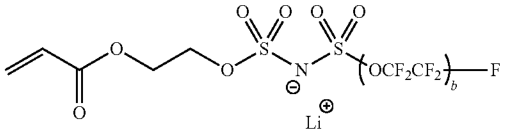

Structural Formula 43

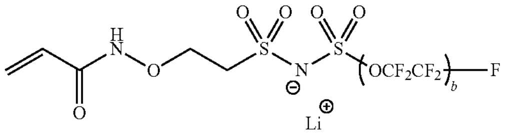

-continued

Structural Formula 44

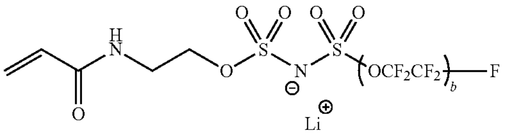

Structural Formula 45

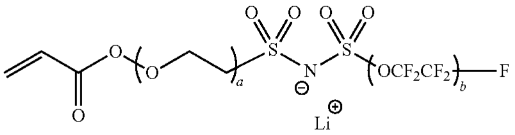

Structural Formula 46

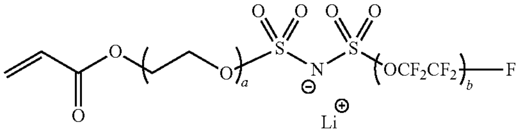

Structural Formula 47

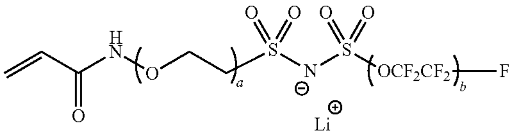

Structural Formula 48

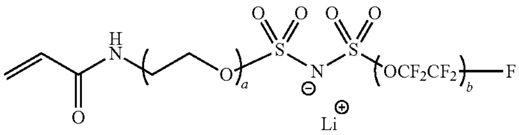

Structural Formula 49

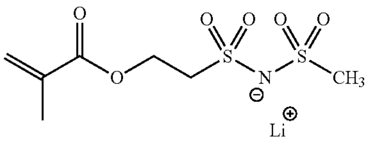

Structural Formula 50

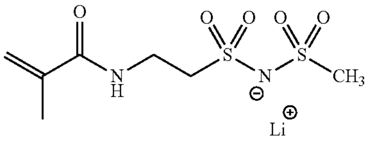

Structural Formula 51

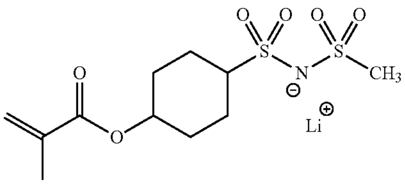

Structural Formula 52

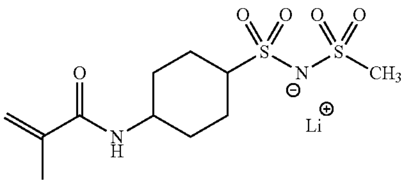

-continued

Structural Formula 53

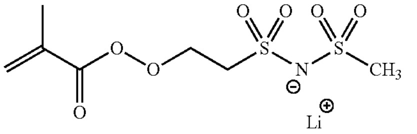

Structural Formula 54

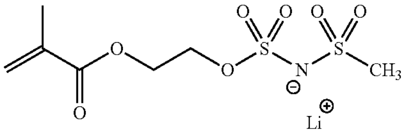

Structural Formula 55

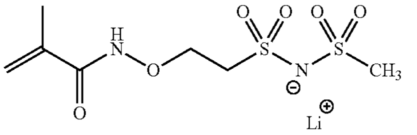

Structural Formula 56

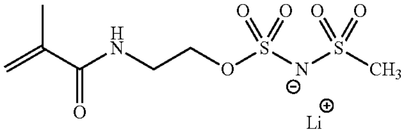

Structural Formula 57

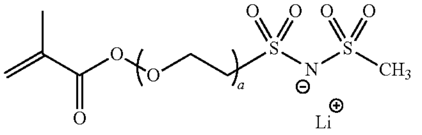

Structural Formula 58

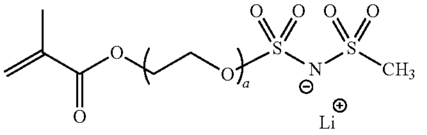

Structural Formula 59

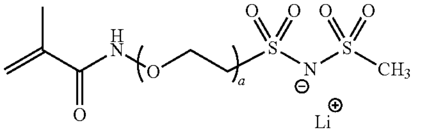

Structural Formula 60

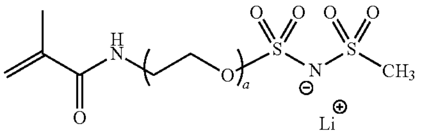

Structural Formula 61

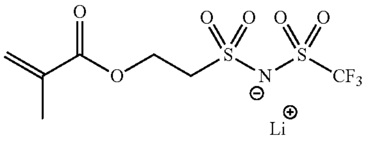

-continued

Structural Formula 62

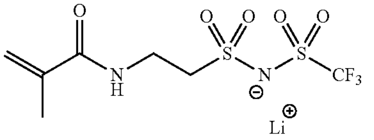

Structural Formula 63

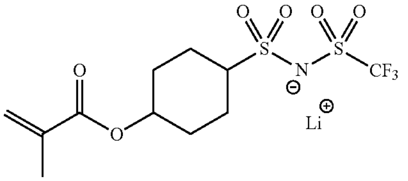

Structural Formula 64

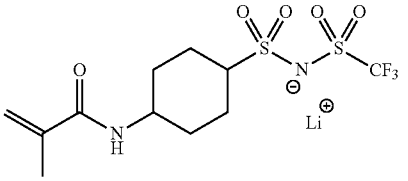

Structural Formula 65

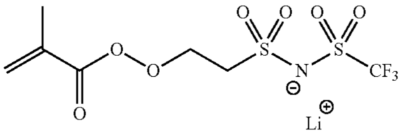

Structural Formula 66

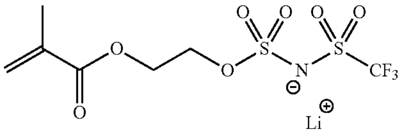

Structural Formula 67

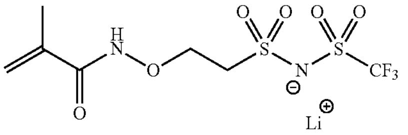

Structural Formula 68

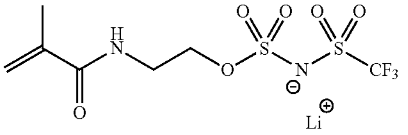

Structural Formula 69

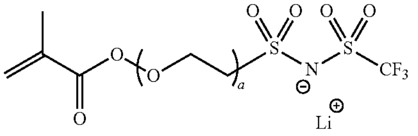

Structural Formula 70

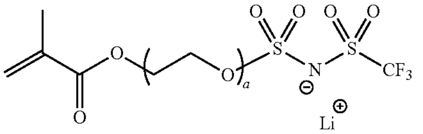

-continued

Structural Formula 71

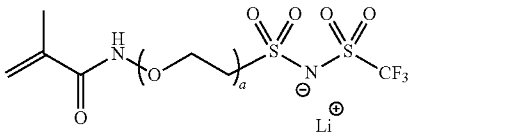

Structural Formula 72

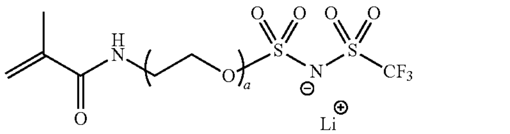

Structural Formula 73

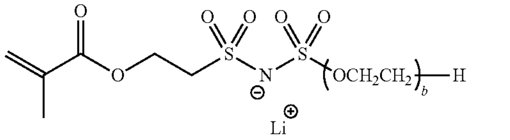

Structural Formula 74

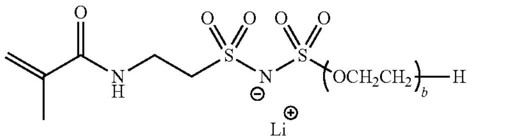

Structural Formula 75

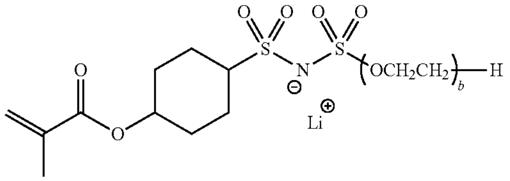

Structural Formula 76

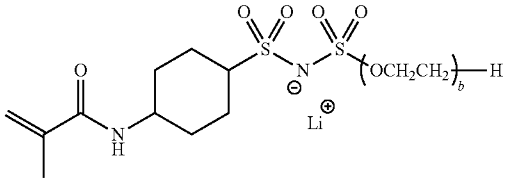

Structural Formula 77

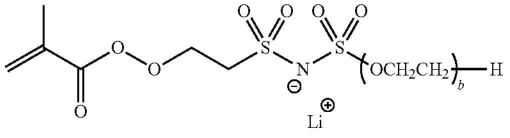

Structural Formula 78

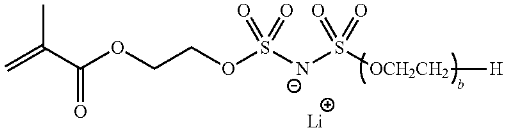

Structural Formula 79

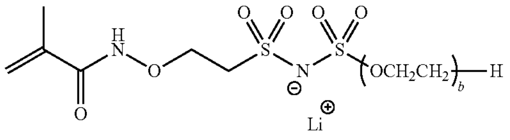

-continued

Structural Formula 80

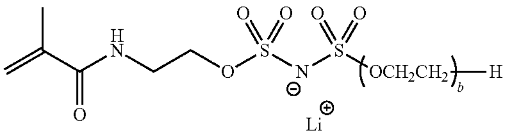

Structural Formula 81

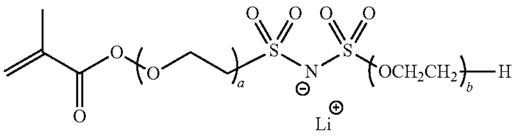

Structural Formula 82

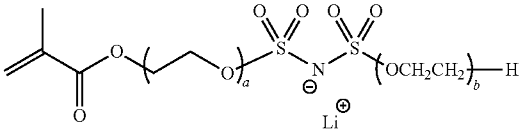

Structural Formula 83

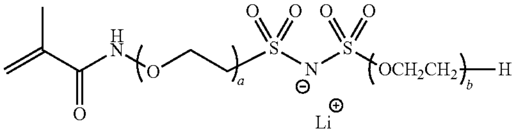

Structural Formula 84

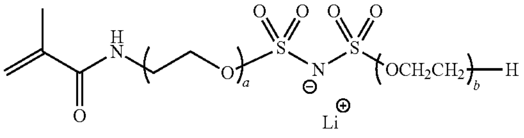

Structural Formula 85

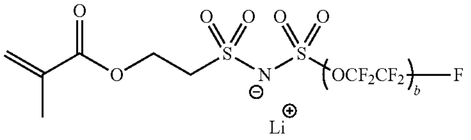

Structural Formula 86

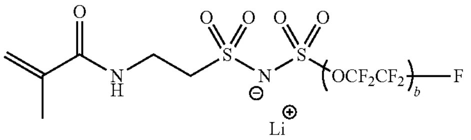

Structural Formula 87

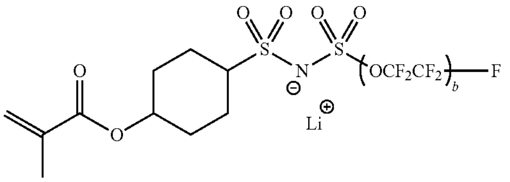

Structural Formula 88

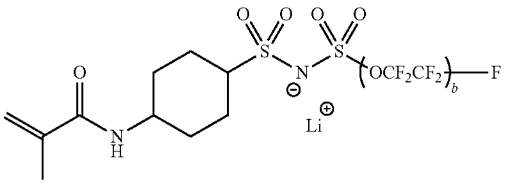

-continued

Structural Formula 89

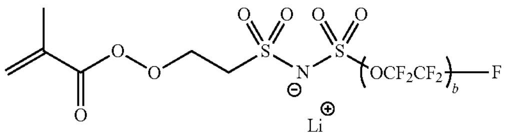

Structural Formula 90

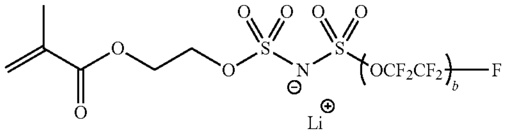

Structural Formula 91

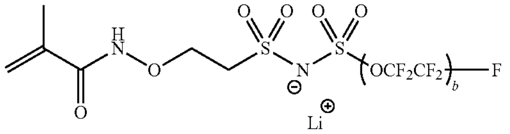

Structural Formula 92

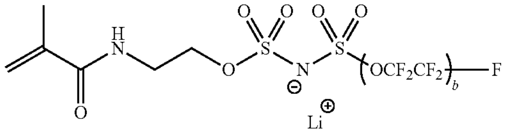

Structural Formula 93

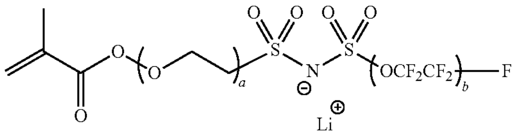

Structural Formula 94

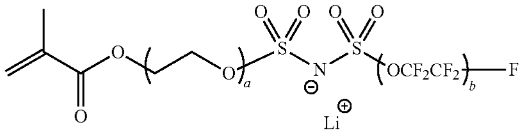

Structural Formula 95

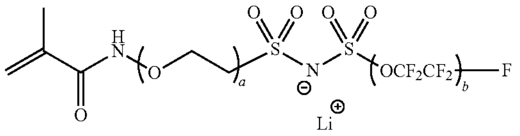

Structural Formula 96

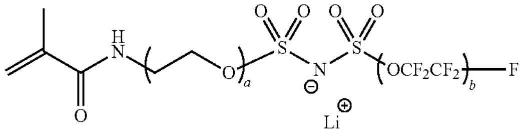

Structural Formula 97

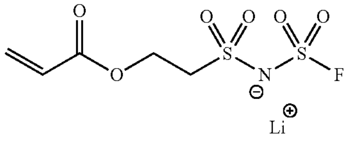

Structural Formula 98

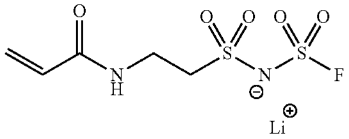

-continued

Structural Formula 99

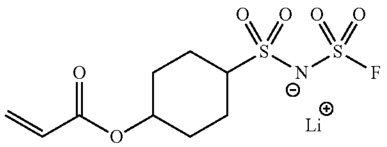

Structural Formula 100

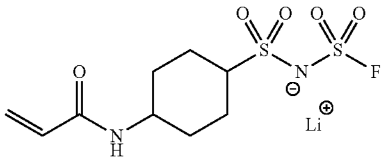

Structural Formula 101

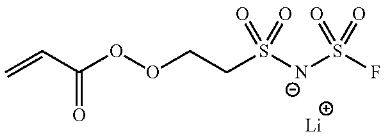

Structural Formula 102

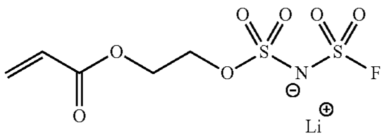

Structural Formula 103

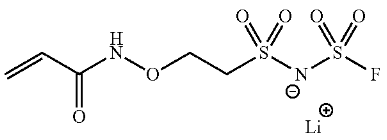

Structural Formula 104

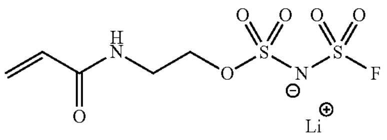

Structural Formula 105

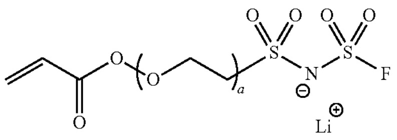

Structural Formula 106

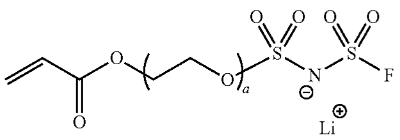

Structural Formula 107

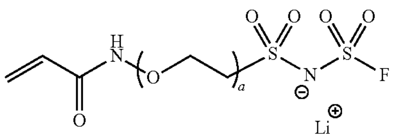

-continued

Structural Formula 108

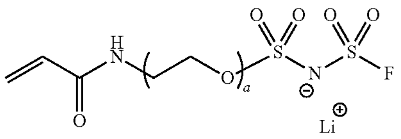

Structural Formula 109

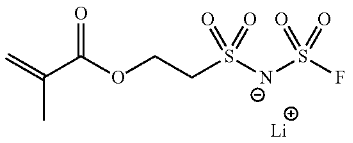

Structural Formula 110

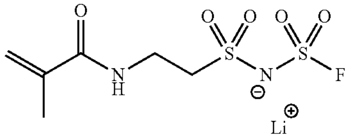

Structural Formula 111

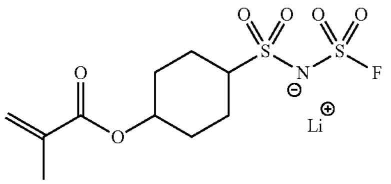

Structural Formula 112

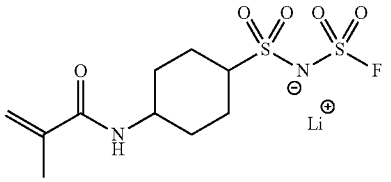

Structural Formula 113

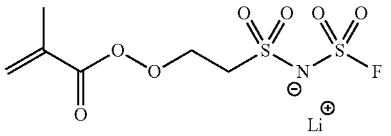

Structural Formula 114

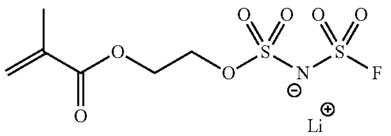

Structural Formula 115

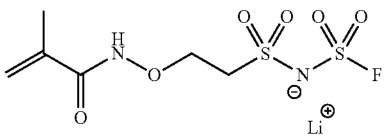

Structural Formula 116

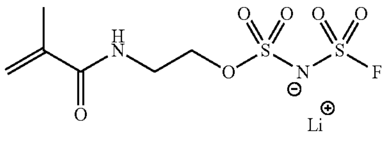

-continued

Structural Formula 117

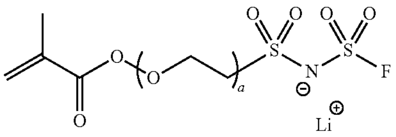

Structural Formula 118

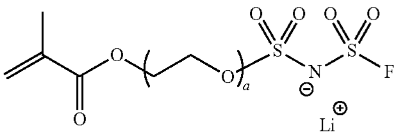

Structural Formula 119

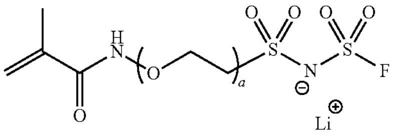

Structural Formula 120

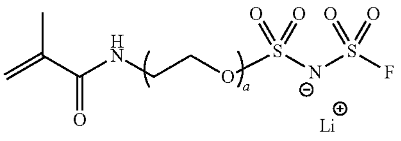

In Structural Formula 9~12, 21~48, 57~60, 69~96, 105~108, and 117~120 a and b is an integer of 2 to 4 respectively.

In addition, one embodiment of the present disclosure provides an electrolyte composition for a lithium secondary battery, which includes a non-aqueous organic solvent; a lithium salt; and a compound represented by Formula 1 below:

[Formula 1]

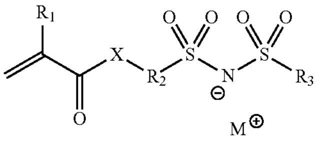

wherein, $R_1$ is hydrogen or an alkyl group having 1 to 4 carbon atoms, $R_2$ includes one or more selected from an alkylene group having 1 to 10 carbon atoms, an oxyalkylene group having 1 to 10 carbon atoms, a cycloalkylene group having 5 to 10 carbon atoms, and

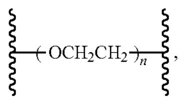

$R_3$ is a fluoro group, an alkyl group having 1 to 10 carbon atoms, an alkoxy group having 1 to 10 carbon atoms, or

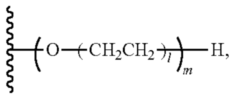

wherein one or more hydrogens included in the alkyl groups, the alkylene group, the alkoxy group, the oxyalkylene group, the cycloalkylene group,

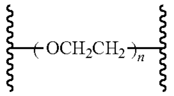 and 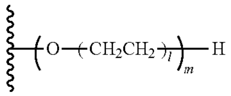

are optionally substituted with a fluorine atom,

X is an oxygen atom (O) or —$NR_4$, wherein $R_4$ is hydrogen or an alkyl group having 1 to 4 carbon atoms, M includes one or more selected from the group consisting of lithium, sodium, potassium, tetraalkyl ammonium having 1 to 4 carbon atoms, and tetraalkyl phosphonium having 1 to 4 carbon atoms, l is an integer of 1 to 6, and each of m and n is an integer of 2 to 20.

Here, the compound represented by Formula 1 may be included at 0.01 to 3 wt % with respect to the total weight of the electrolyte composition.

In addition, the lithium salt may include one or more selected from the group consisting of LiCl, LiBr, LiI, $LiClO_4$, $LiBF_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, and $(FSO_2)_2NLi$.

In addition, the non-aqueous organic solvent may include N-methyl-2-pyrrolidinone, ethylene carbonate, propylene carbonate, butylene carbonate, dimethyl carbonate, diethyl carbonate, γ-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Furthermore, one embodiment of the present disclosure provides a lithium secondary battery, which includes:

an electrode assembly that includes a positive electrode including one or more positive electrode active materials of lithium metal oxides represented by Formulas 2 and 3 below, a negative electrode, and a separator interposed between the positive electrode and the negative electrode; and the electrolyte composition according to the present disclosure:

$$Li_x[Ni_yCo_zMn_wM^1_v]O_2 \quad \text{[Formula 2]}$$

$$LiM^2_pMn_{(2-p)}O_4 \quad \text{[Formula 3]}$$

In Formulas 2 and 3, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w and v satisfy $1.0 \le x \le 1.30$, $0.5 \le y \le 1$, $0 \le z \le 0.3$, $0 \le w \le 0.3$, and $0 \le v \le 0.1$, respectively, wherein y+z+w+v=1, $M^2$ is Ni, Co or Fe, and p is $0.05 \le p \le 0.6$.

Here, the positive electrode active material may include one or more selected from the group consisting of $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, and $LiNi_{0.5}Mn_{1.5}O_4$.

In addition, the negative electrode active material may consist of a carbon material and a silicon material, wherein the silicon material may include one or more of silicon (Si), silicon carbide (SiC) and silicon oxide (SiOq, $0.8 \le q \le 2.5$).

Moreover, the silicon material may be included at 1 to 20 wt % with respect to the total weight of the negative electrode active material.

Advantageous Effects

An electrolyte additive according to the present disclosure forms a coating film on an electrode surface in the activation of a secondary battery, so the generation of a large amount of gas under a high temperature condition can be prevented, and a cell OCV drop and a decrease in capacity retention rate, which are caused by elution of metal ions from an electrode, can be effectively prevented, resulting in effective improvement in durability, performance and high-temperature safety of the battery.

BRIEF DESCRIPTION OF THE DRAWINGS

FIG. 1 is a graph showing the results of Raman spectroscopy of electrolyte compositions respectively prepared in Example 1 and Comparative Example 1 according to the present disclosure.

FIG. 2 is a graph showing the results of differential capacity curve analysis for half-cells including the electrolyte compositions respectively prepared in Example 1 and Comparative Example 1 according to the present disclosure.

FIG. 3 is a graph showing the results of linear sweep voltammetry for three-electrode batteries including the electrolyte compositions respectively prepared in Example 1 and Comparative Example 1 according to the present disclosure.

FIGS. 4A and 4B are a set of graphs showing the results of X-ray photoelectron spectroscopy for coating films formed on positive electrodes surfaces of each lithium secondary battery prepared in Example 13 and Comparative Examples 11 and 14 according to the present disclosure, respectively, after charging/discharging.

FIGS. 5A and 5B are a set of graphs showing the results of X-ray photoelectron spectroscopy for coating films formed on negative electrodes surfaces of each lithium secondary battery including the electrolyte composition prepared in Example 13 and Comparative Examples 11 and 14 according to the present disclosure, respectively, after charging/discharging.

DETAILED DESCRIPTION

The present disclosure may have various modifications and various examples, and thus specific examples are illustrated in the drawings and described in detail in the detailed description.

However, it should be understood that the present disclosure is not limited to specific embodiments, and includes all modifications, equivalents or alternatives within the spirit and technical scope of the present disclosure.

The terms "comprise," "include" and "have" used herein designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance.

In addition, when a part of a layer, film, region or plate is disposed "on" another part, this includes not only a case in which one part is disposed "directly on" another part, but a case in which a third part is interposed therebetween. In contrast, when a part of a layer, film, region or plate is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

In addition, in the present disclosure, the "included as a main component" may mean that a defined component is included at 50 wt % or more, 60 wt % or more, F70 wt % or more, 80 wt % or more, 90 wt % or more, or 95 wt % or more with respect to the total weight. For example, the "graphite is included as a main ingredient in a negative electrode active material" means that graphite is included at 50 wt % or more, 60 wt % or more, 70 wt % or more, 80 wt % or more, 90 wt % or more, or 95 wt % or more with respect to the total weight of the negative electrode active material, and in some cases, it means that a negative electrode active material totally consists of graphite and thus includes 100 wt % of graphite.

Hereinafter, the present disclosure will be described in further detail.

Electrolyte Additive for Secondary Battery

One embodiment of the present disclosure provides an electrolyte additive for a secondary battery including the compound represented by Formula 1 below:

[Formula 1]

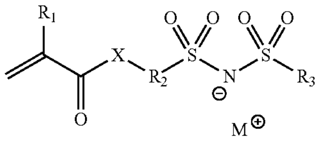

wherein, $R_1$ is hydrogen or an alkyl group having 1 to 4 carbon atoms, $R_2$ includes one or more selected from an alkylene group having 1 to 10 carbon atoms, an oxyalkylene group having 1 to 10 carbon atoms, a cycloalkylene group having 5 to 10 carbon atoms, and

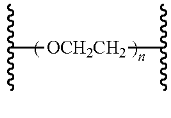, $R_3$ is a fluoro group, an alkyl group having 1 to 10 carbon atoms, an alkoxy group having 1 to 10 carbon atoms, or

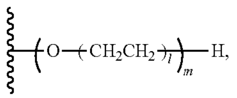, wherein one or more hydrogens included in the alkyl groups, the alkylene group, the alkoxy group, the oxyalkylene group, the cycloalkylene group,

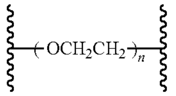 and 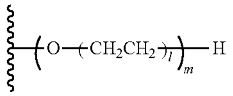

are optionally substituted with a fluorine atom,

X is an oxygen atom (O) or —$NR_4$, wherein $R_4$ is hydrogen or an alkyl group having 1 to 4 carbon atoms, M includes one or more selected from the group consisting of lithium, sodium, potassium, tetraalkyl ammonium having 1 to 4 carbon atoms, and tetraalkyl phosphonium having 1 to 4 carbon atoms, l is an integer of 1 to 6, and each of m and n is an integer of 2 to 20.

The electrolyte additive for a secondary battery according to the present disclosure includes an ionic compound including a mother nucleus to which a (meth)acrylate group or an acrylamide group is bonded via a functional group that includes a saturated hydrocarbon chain or a structure to which an oxygen atom is introduced to a saturated hydrocarbon chain, at one side based on a sulfonylimide group as shown in Formula 1. As the compound has a structure including a (meth)acrylate group or an acrylamide group bonded at one side based on a sulfonylimide group using a functional group that has an alkylene structure of a saturated hydrocarbon chain or an ether group formed by introducing an oxygen atom to a saturated hydrocarbon chain as a linker, and having a charge in this molecule, an organic and/or inorganic coating film may be uniformly formed on the surface of the positive electrode and/or the negative electrode in the activation of the secondary battery including the electrolyte additive. Therefore, the electrolyte addictive may be directly included in the organic and/or inorganic coating film formed on the surface of the positive electrode and/or the negative electrode in the form of a monomolecular (or monomer) in the activation of a secondary battery, and thus, the electrolyte additive can inhibit gas generation due to decomposition of the electrolyte when the battery is exposed to a high temperature, and improve the OCV drop phenomenon and capacity reduction of the battery, which occur at the positive electrode.

To this end, in the compound represented by Formula 1, $R_1$ is hydrogen, a methyl group, an ethyl group or a propyl group, $R_2$ includes one or more selected from a methylene group, an ethylene group, a propylene group, a butylene group, an oxymethylene group, an oxyethylene group, an oxypropylene group, an oxybutylene group, a cyclobutylene group, a cyclopentylene group, a cyclohexylene group, a cycloheptylene group,

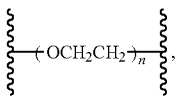, and 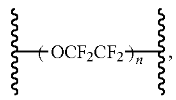, $R_3$ is a fluoro group, a methyl group, an ethyl group, a propyl group, a butyl group, a methoxy group, an ethoxy group, a propoxy group,

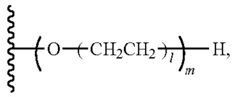 or 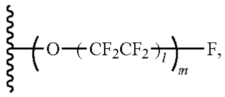

X is an oxygen atom (O), —NH, —$NCH_3$, or —$NCH_2CH_3$,

M includes one or more selected from the group consisting of lithium, sodium, tetramethyl ammonium having 1 to 4 carbon atoms, and tetraalkyl phosphonium having 1 to 4 carbon atoms, 1 is an integer of 1 to 6, and each of m and n is an integer of 2 to 20.

Specifically, $R_1$ may be hydrogen or a methyl group, $R_2$ comprises one or more selected from a methylene group, an ethylene group, a propylene group, an oxymethylene group, an oxyethylene group, an oxypropylene group, a cyclobutylene group, a cyclopentylene group, a cyclohexylene group, a cycloheptylene group,

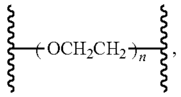 and 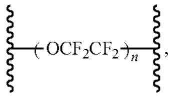

$R_3$ may be a fluoro group, a methyl group, an ethyl group, a propyl group, a methoxy group, an ethoxy group,

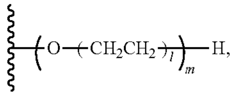 or 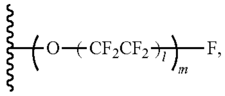

X may be an oxygen atom (O), —NH, or —$NCH_3$,

M may be lithium, 1 may be an integer of 1 or 2, and each of m and n may be an integer of 2 to 10.

In one example, the compound represented by Formula 1 may be one or more compounds selected from Structural Formula 1 to Structural Formula 120 below:

Structural Formula 1

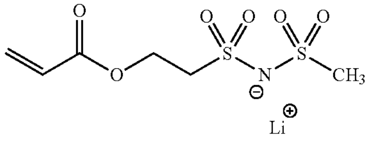

Structural Formula 2

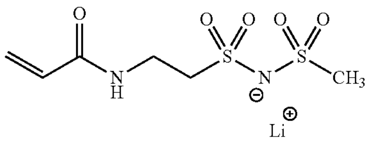

-continued

Structural Formula 3

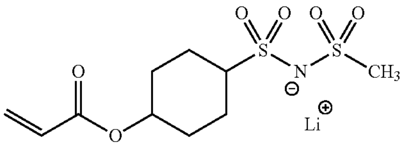

Structural Formula 4

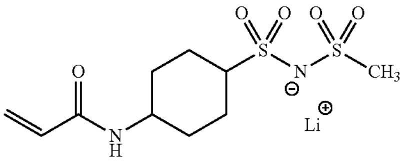

Structural Formula 5

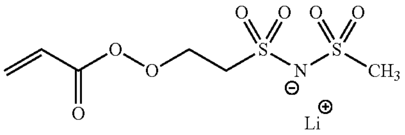

Structural Formula 6

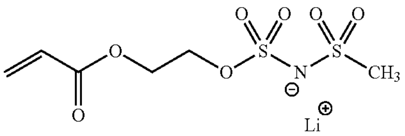

Structural Formula 7

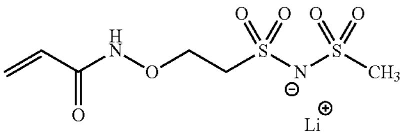

Structural Formula 8

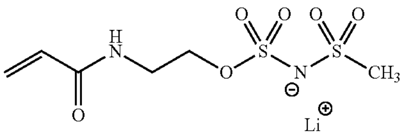

Structural Formula 9

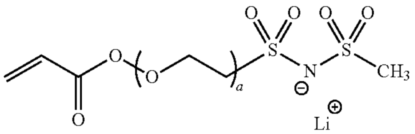

Structural Formula 10

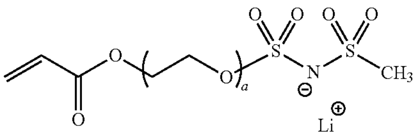

Structural Formula 11

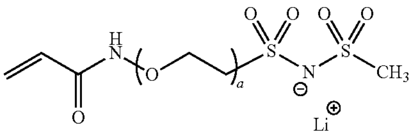

-continued

Structural Formula 12

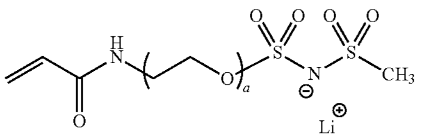

Structural Formula 13

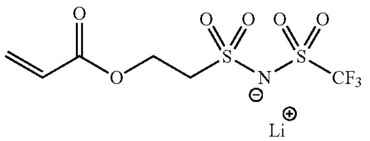

Structural Formula 14

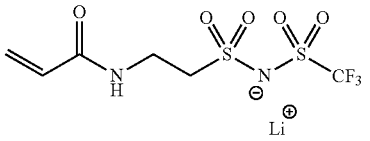

Structural Formula 15

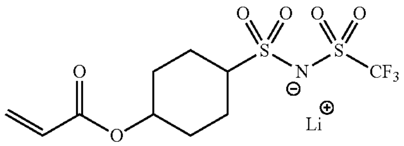

Structural Formula 16

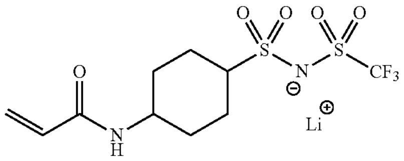

Structural Formula 17

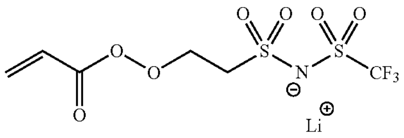

Structural Formula 18

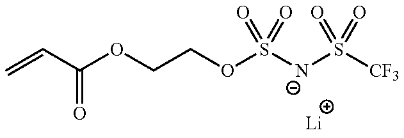

Structural Formula 19

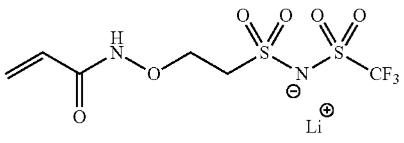

Structural Formula 20

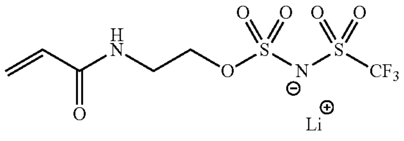

-continued

Structural Formula 21

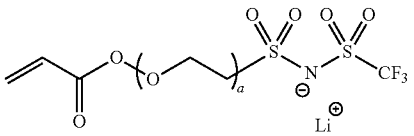

Structural Formula 22

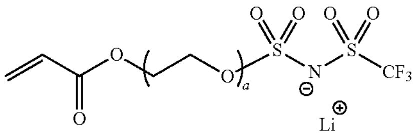

Structural Formula 23

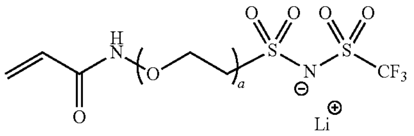

Structural Formula 24

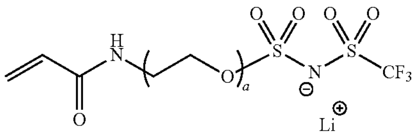

Structural Formula 25

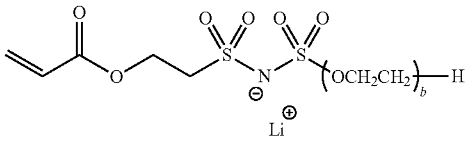

Structural Formula 26

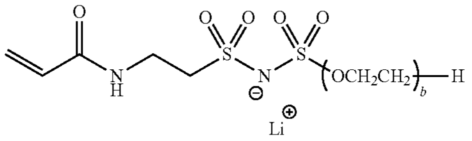

Structural Formula 27

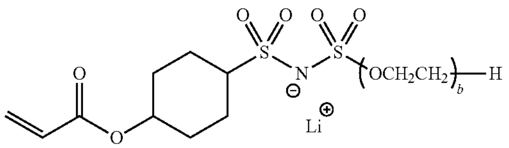

Structural Formula 28

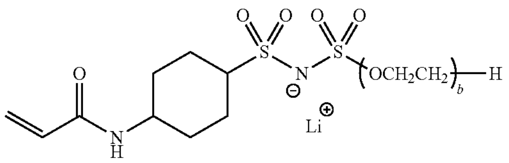

Structural Formula 29

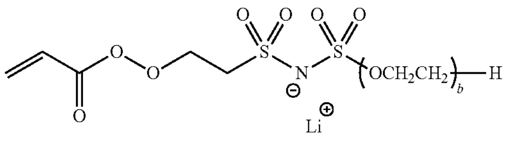

-continued

Structural Formula 30

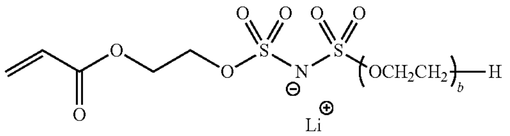

Structural Formula 31

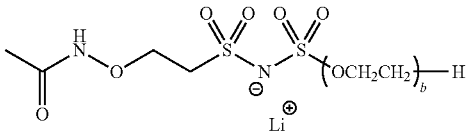

Structural Formula 32

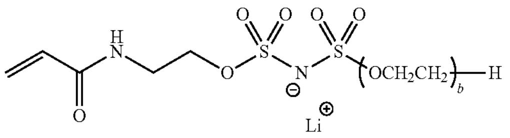

Structural Formula 33

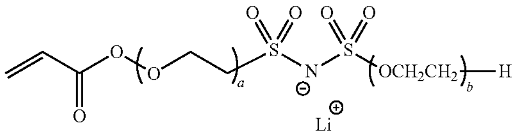

Structural Formula 34

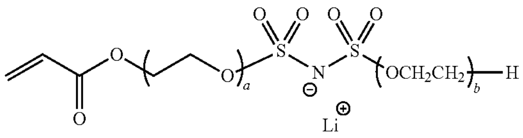

Structural Formula 35

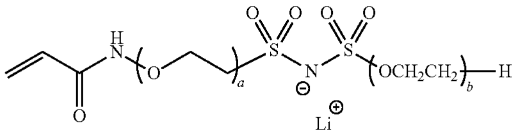

Structural Formula 36

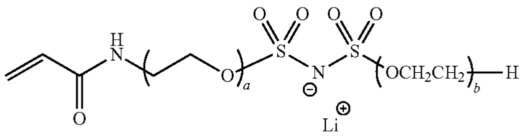

Structural Formula 37

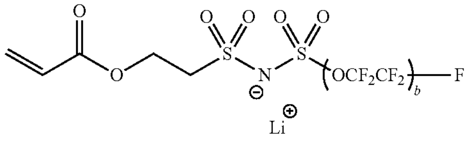

Structural Formula 38

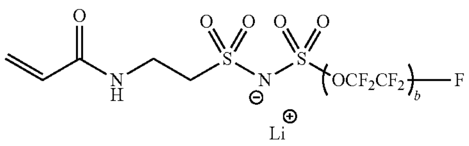

-continued

Structural Formula 39

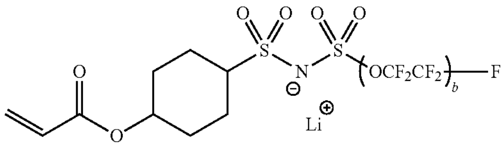

Structural Formula 40

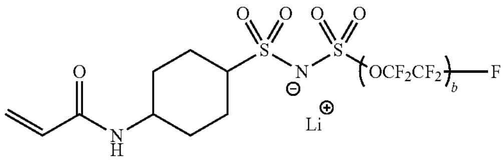

Structural Formula 41

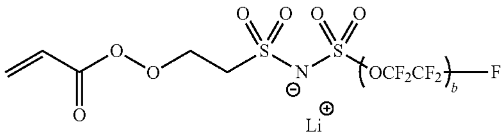

Structural Formula 42

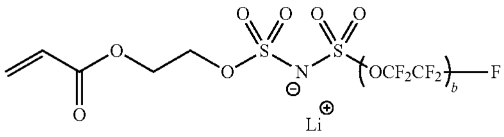

Structural Formula 43

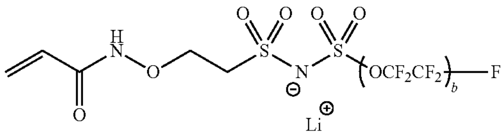

Structural Formula 44

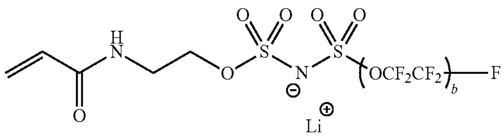

Structural Formula 45

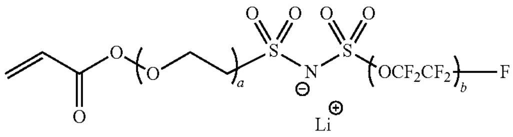

Structural Formula 46

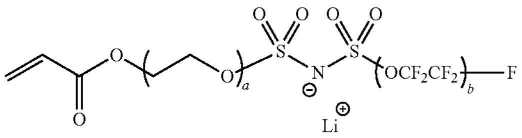

Structural Formula 47

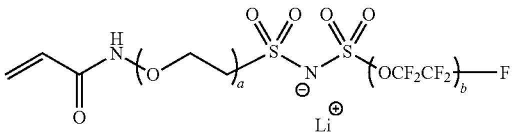

-continued

Structural Formula 48

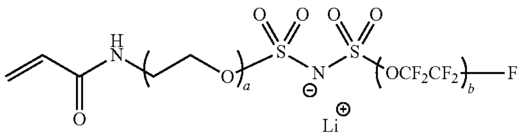

Structural Formula 49

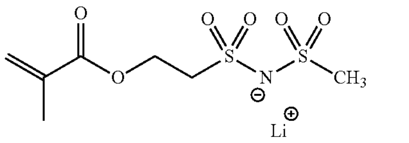

Structural Formula 50

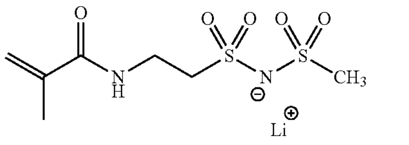

Structural Formula 51

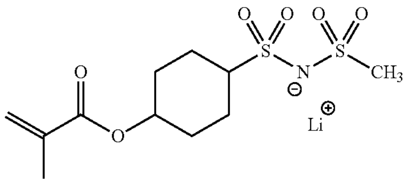

Structural Formula 52

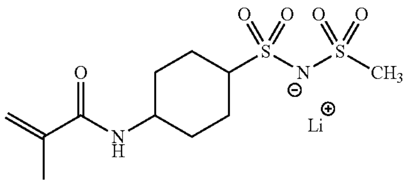

Structural Formula 53

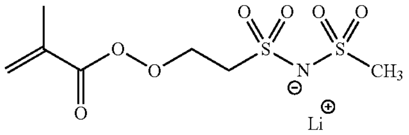

Structural Formula 54

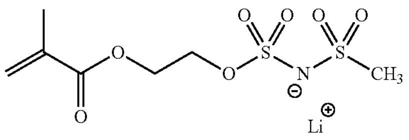

Structural Formula 55

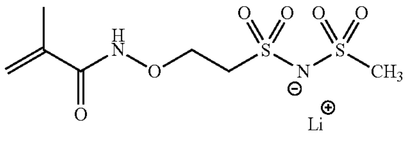

Structural Formula 56

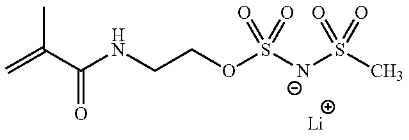

-continued

Structural Formula 57

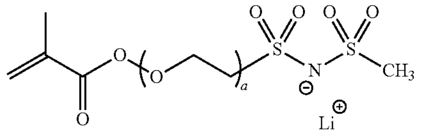

Structural Formula 58

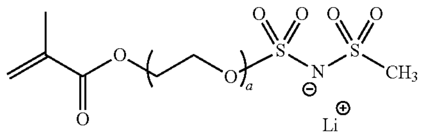

Structural Formula 59

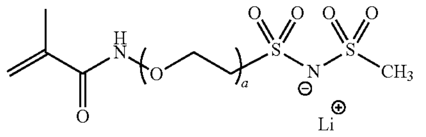

Structural Formula 60

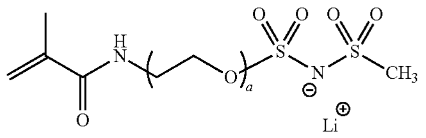

Structural Formula 61

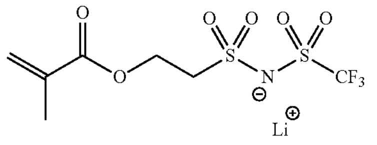

Structural Formula 62

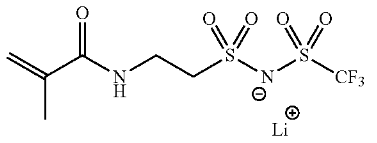

Structural Formula 63

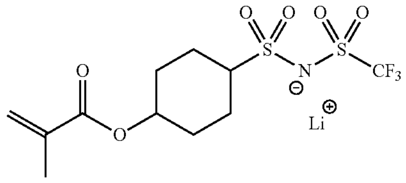

Structural Formula 64

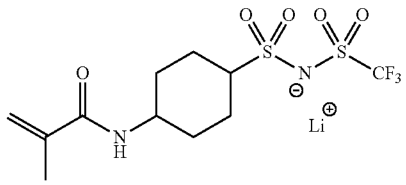

Structural Formula 65

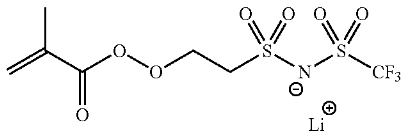

-continued

Structural Formula 66

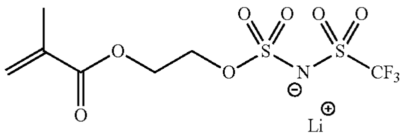

Structural Formula 67

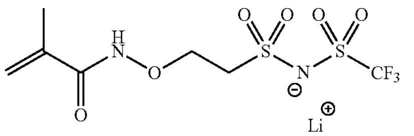

Structural Formula 68

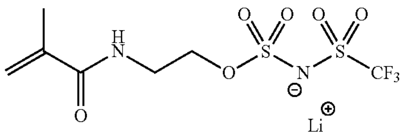

Structural Formula 69

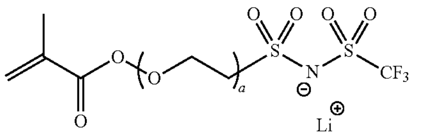

Structural Formula 70

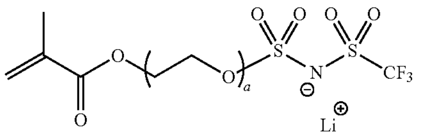

Structural Formula 71

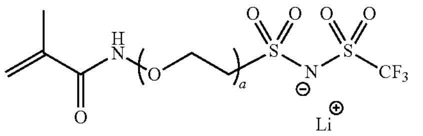

Structural Formula 72

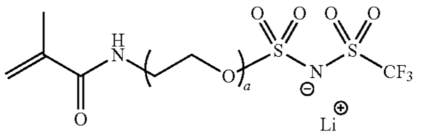

Structural Formula 73

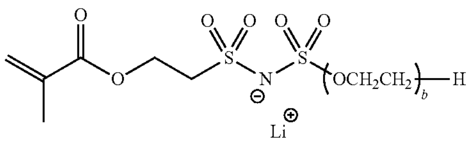

Structural Formula 74

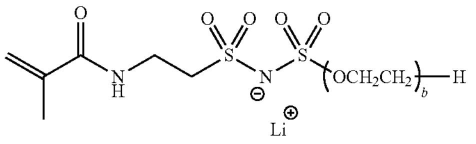

-continued

Structural Formula 75

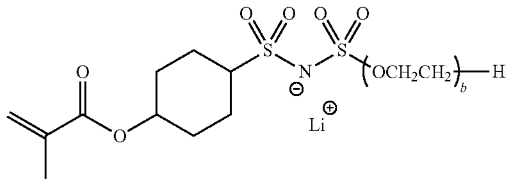

Structural Formula 76

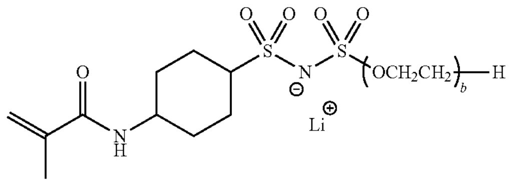

Structural Formula 77

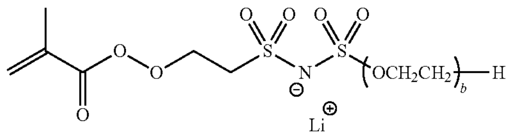

Structural Formula 78

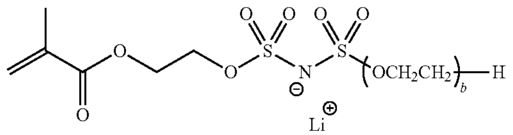

Structural Formula 79

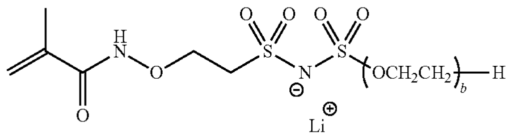

Structural Formula 80

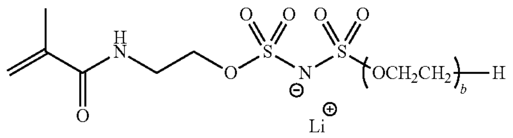

Structural Formula 81

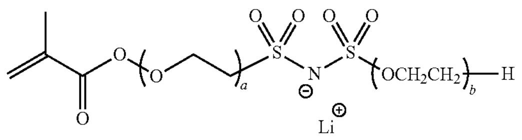

Structural Formula 82

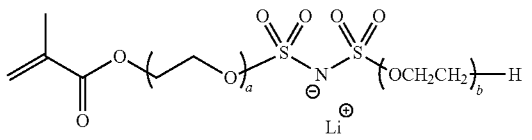

Structural Formula 83

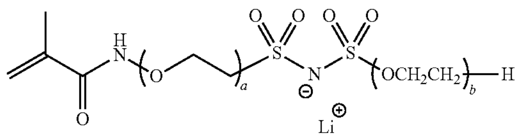

-continued

Structural Formula 84

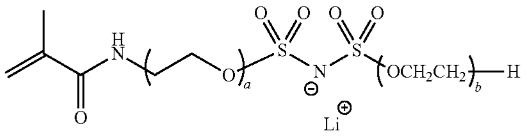

Structural Formula 85

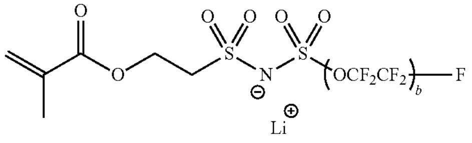

Structural Formula 86

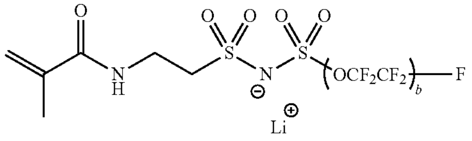

Structural Formula 87

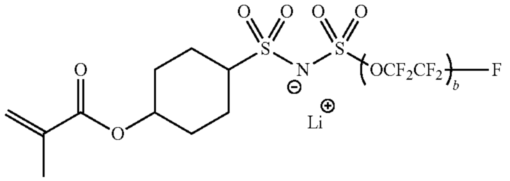

Structural Formula 88

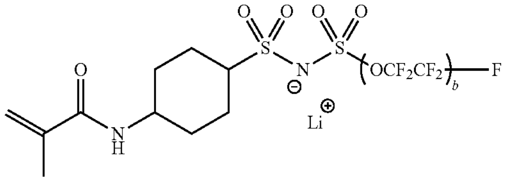

Structural Formula 89

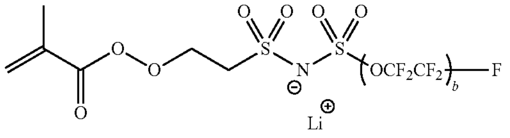

Structural Formula 90

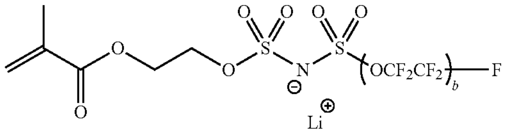

Structural Formula 91

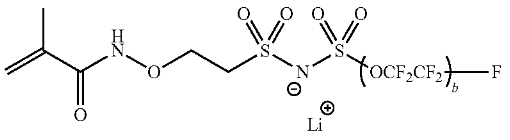

Structural Formula 92

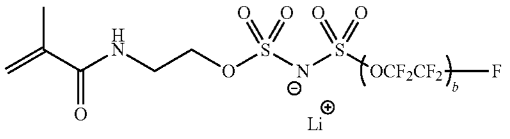

-continued

Structural Formula 93

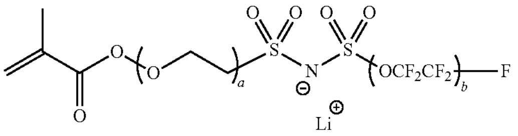

Structural Formula 94

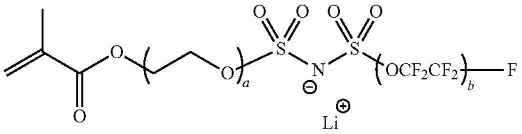

Structural Formula 95

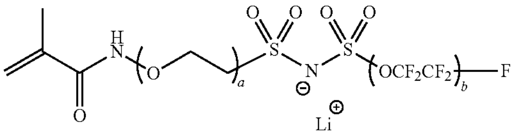

Structural Formula 96

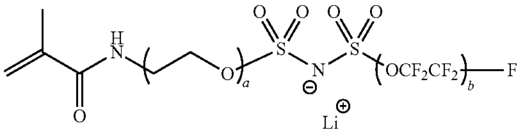

Structural Formula 97

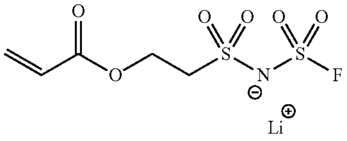

Structural Formula 98

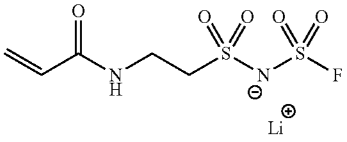

Structural Formula 99

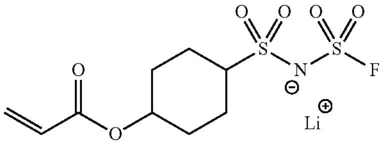

Structural Formula 100

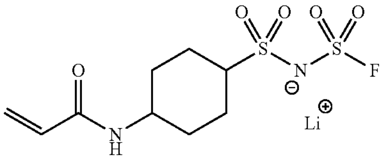

Structural Formula 101

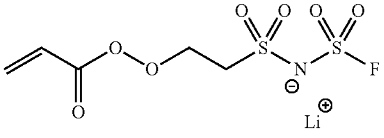

Structural Formula 102

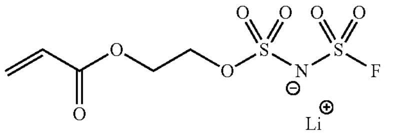

Structural Formula 103

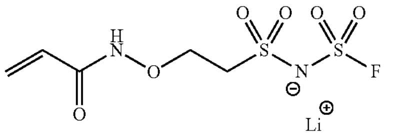

Structural Formula 104

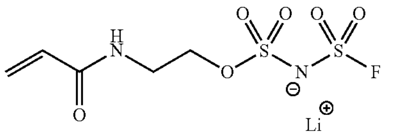

Structural Formula 105

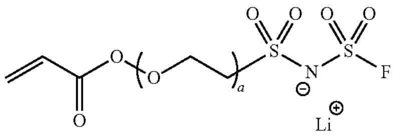

Structural Formula 106

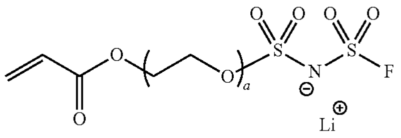

Structural Formula 107

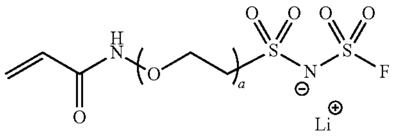

Structural Formula 108

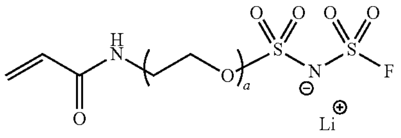

Structural Formula 109

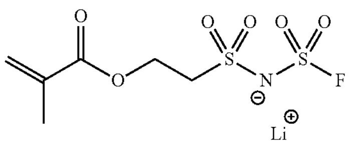

Structural Formula 110

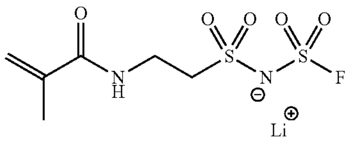

Structural Formula 111

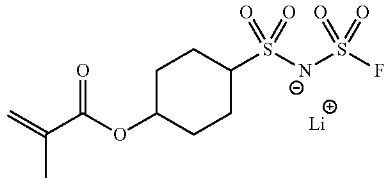

Structural Formula 112

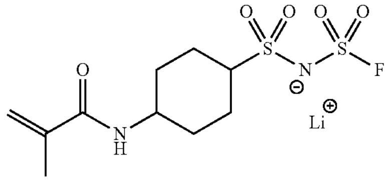

Structural Formula 113

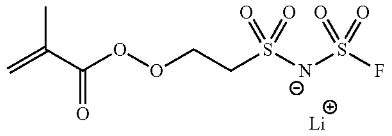

Structural Formula 114

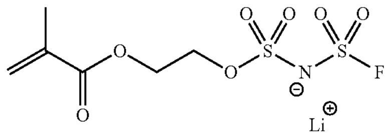

Structural Formula 115

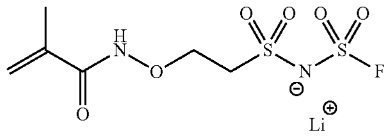

Structural Formula 116

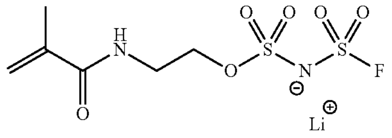

Structural Formula 117

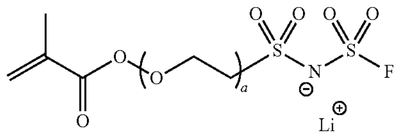

Structural Formula 118

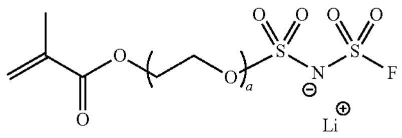

Structural Formula 119

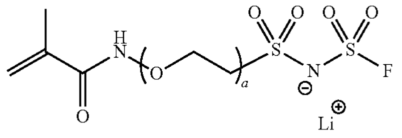

-continued

Structural Formula 120

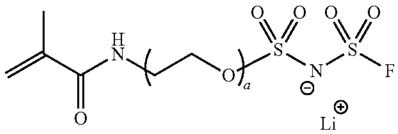

In Structural Formula 9~12, 21~48, 57~60, 69~96, 105~108, and 117~120 a and b is an integer of 2 to 4 respectively.

Since the electrolyte additive according to the present disclosure, as described above, has a structure that has a (meth)acrylate group or an acrylamide group binding via a functional group that has an alkylene structure of a saturated hydrocarbon chain or an ether group formed by introducing an oxygen atom to a saturated hydrocarbon chain and has a charge in the molecule, at one side based on a sulfonylimide group, the electrolyte additive may be directly involved in a solvation shell of lithium ions even under a low potential in the activation of the battery to uniformly form an inorganic coating film through a reduction reaction on the surface of the negative electrode and to uniformly form an inorganic coating film through an oxidation reaction on the surface of the positive electrode at the same time.

Therefore, the electrolyte additive can inhibit gas generation caused by decomposition of the electrolyte when the battery is exposed to a high temperature, and improve the OCV drop phenomenon and capacity reduction of the battery, which occur at the positive electrode, resulting in the prevention of the deterioration of a secondary battery and further improvement in high-temperature safety.

Electrolyte Composition for Lithium Secondary Battery

In addition, one embodiment of the present disclosure provides an electrolyte composition for a lithium secondary battery, which includes a non-aqueous organic solvent; a lithium salt; and a compound represented by Formula 1 below:

[Formula 1]

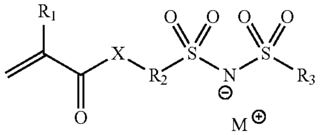

wherein, $R_1$ is hydrogen or an alkyl group having 1 to 4 carbon atoms, $R_2$ includes one or more selected from an alkylene group having 1 to 10 carbon atoms, an oxyalkylene group having 1 to 10 carbon atoms, a cycloalkylene group having 5 to 10 carbon atoms, and

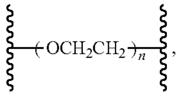, $R_3$ is a fluoro group, an alkyl group having 1 to 10 carbon atoms, an alkoxy group having 1 to 10 carbon atoms, or

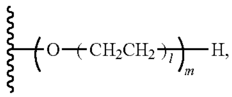, wherein one or more hydrogens included in the alkyl groups, the alkylene group, the alkoxy group, the oxyalkylene group, the cycloalkylene group,

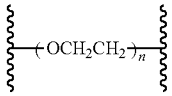 and 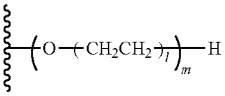

are optionally substituted with a fluorine atom,

X is an oxygen atom (O) or —$NR_4$, wherein $R_4$ is hydrogen or an alkyl group having 1 to 4 carbon atoms, M includes one or more selected from the group consisting of lithium, sodium, potassium, tetraalkyl ammonium having 1 to 4 carbon atoms, and tetraalkyl phosphonium having 1 to 4 carbon atoms, l is an integer of 1 to 6, and each of m and n is an integer of 2 to 20.

As the electrolyte composition for a lithium secondary battery according to the present disclosure is a non-aqueous electrolyte composition, it may be a liquid electrolyte which has a composition in which a lithium salt and an electrolyte additive are included in a non-aqueous organic solvent. Here, the electrolyte composition includes the above-described electrolyte additive, which includes the compound represented by Formula 1, so it may be directly involved in a solvation shell of lithium ions in the activation of the battery including the electrolyte composition, thereby uniformly forming a negatively charged and/or inorganic coating film on the surface of a negative electrode through a reduction reaction.

To this end, in the compound represented by Formula 1, $R_1$ is hydrogen, a methyl group, an ethyl group or a propyl group, $R_2$ includes one or more selected from a methylene group, an ethylene group, a propylene group, a butylene group, an oxymethylene group, an oxyethylene group, an oxypropylene group, an oxybutylene group, a cyclobutylene group, a cyclopentylene group, a cyclohexylene group, a cycloheptylene group,

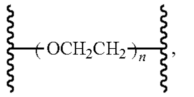, and 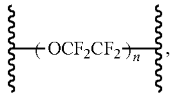, $R_3$ is a fluoro group, a methyl group, an ethyl group, a propyl group, a butyl group, a methoxy group, an ethoxy group, a propoxy group,

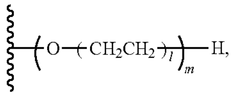, or 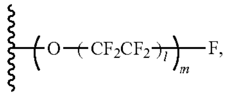,

X is an oxygen atom (O), —NH, —$NCH_3$, or —$NCH_2CH_3$,

M includes one or more selected from the group consisting of lithium, sodium, tetramethyl ammonium having 1 to 4 carbon atoms, and tetraalkyl phosphonium having 1 to 4 carbon atoms, 1 is an integer of 1 to 6, and each of m and n is an integer of 2 to 20.

Specifically, $R_1$ may be hydrogen or a methyl group, $R_2$ comprises one or more selected from a methylene group, an ethylene group, a propylene group, an oxymethylene group, an oxyethylene group, an oxypropylene group, a cyclobutylene group, a cyclopentylene group, a cyclohexylene group, a cycloheptylene group,

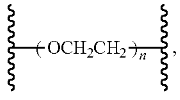, and 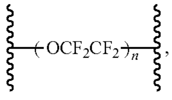, $R_3$ may be a fluoro group, a methyl group, an ethyl group, a propyl group, a methoxy group, an ethoxy group,

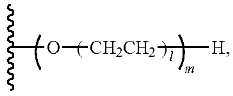 or 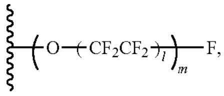,

X may be an oxygen atom (O), —NH, or —$NCH_3$,

M may be lithium, 1 may be an integer of 1 or 2, and each of m and n may be an integer of 2 to 10.

Here, the compound represented by Formula 1 may be included at a certain content in the electrolyte composition. Specifically, the compound represented by Formula 1 may be included at 0.01 to 5 wt %, and more specifically, 0.05 to 3 wt % or 1.0 to 2.5 wt % with respect to the total weight of the electrolyte composition. In the present disclosure, the content of the electrolyte additive is used in excess outside the above range to increase the viscosity of the electrolyte composition, thereby preventing the wettability of an electrode and a separator from being degraded. Furthermore, a polymerization by self-reaction is induced in the electrolyte composition, thereby preventing degraded battery performance due to a reduction in ion conductivity of the electrolyte composition. In addition, the present disclosure may prevent the additive effect from being insignificantly implemented when the electrolyte additive is used at a trace amount outside the above range.

Meanwhile, the lithium salt used in the electrolyte composition may be applied without particular limitation as long as it is used in a non-aqueous electrolyte in the art. Specifically, the lithium salt may include one or more selected from the group consisting of LiCl, LiBr, LiI, $LiClO_4$, $LiBF_4$, $LiB10Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, and $(FSO_2)_2NLi$.

The concentration of the lithium salt is not particularly limited, and the lower limit of the appropriate concentration range is 0.5 mol/L or more, specifically 0.7 mol/L or more, and more specifically 0.9 mol/L or more, and the upper limit of the appropriate concentration range is 2.5 mol/L or less, specifically 2.0 mol/L or less, and more specifically 1.5 mol/L or less. When the concentration of the lithium salt is lower than 0.5 mol/L, there is a risk that ion conductivity is reduced, and the cycle characteristics and output characteristics of a non-aqueous electrolyte battery are lowered. In addition, when the concentration of the lithium salt exceeds 2.5 mol/L, the viscosity of an electrode for non-aqueous electrolyte battery increases, and thus there is a risk of decreasing ion conductivity and lowering the cycle characteristics and output characteristics of a non-aqueous electrolyte battery.

In addition, when a large amount of lithium salt is dissolved in a non-aqueous organic solvent at one time, the liquid temperature may increase because of the dissolution heat for the lithium salt. As described above, when the temperature of the non-aqueous organic solvent significantly increases due to the dissolution heat for the lithium salt, there is a risk that the decomposition may be accelerated to generate hydrogen fluoride (HF). Hydrogen fluoride (HF) is not preferable because it causes degraded battery performance. Therefore, a temperature at which the lithium salt is dissolved in a non-aqueous organic solvent may be adjusted to −20 to 80° C., and specifically 0 to 60° C., but the present disclosure is not particularly limited thereto.

Furthermore, a non-aqueous organic solvent used in the electrolyte composition may be applied without particular limitation as long as it can be used in a non-aqueous electrolyte in the art. Specifically, examples of the non-aqueous organic solvents may include aprotic organic solvents such as N-methyl pyrrolidinone, ethylene carbonate (EC), propylene carbonate, butylene carbonate, dimethyl carbonate, diethyl carbonate, γ-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-diethyl-2-imidazolidinone, a propylene carbonate derivative, a tetrahydrofuran derivative, ether, methyl propionate, and ethyl propionate.

In addition, as a non-aqueous solvent used in the present disclosure, one type of the above examples may be used alone, or two or more types thereof may be used by mixing in any combination and ratio according to purpose. In terms of electrochemical stability against the oxidation/reduction of the solvent and chemical stability against heat or the reaction with a solute, among the above examples, particularly, propylene carbonate, ethylene carbonate, fluoroethylene carbonate, diethyl carbonate, dimethyl carbonate, or ethyl methyl carbonate is preferable.

Meanwhile, the electrolyte composition may further include an additive, other than the above-described basic components. Without departing the gist of the present disclosure, an additive generally used in the non-aqueous electrolyte of the present disclosure may be added at any ratio. Specifically, the additive may be a compound having an overcharge prevention effect, a negative electrode coating film-forming effect, and a positive electrode protection effect, such as cyclohexylbenzene, biphenyl, t-butylbenzene, vinylene carbonate, vinylethylene carbonate, difluoroanisole, fluoroethylene carbonate, propane sultone, succinonitrile, or dimethylvinylene carbonate. In addition, in the case of use in a non-aqueous electrolyte battery called a lithium polymer battery, it is also possible to use an electrolyte for a non-aqueous electrolyte battery after being pseudo-solidified by a gelling agent or cross-linked polymer.

Lithium Secondary Battery

Further, one embodiment of the present disclosure provides a lithium secondary battery, which includes:

an electrode assembly that includes a positive electrode including one or more positive electrode active materials of lithium metal oxides represented by Formulas 2 and 3 below, a negative electrode, and a separator interposed between the positive electrode and the negative electrode; and the electrolyte composition according to the present disclosure:

$Li_x[Ni_yCo_zMn_wM^1_v]O_2$ [Formula 2]

$LiM^2_pMn_{(2-p)}O_4$ [Formula 3]

In Formula 2 and Formula 3, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w and v satisfy $1.0 \leq x \leq 1.30$, $0.5 \leq y \leq 1$, $0 \leq z \leq 0.3$, $0 \leq w \leq 0.3$, and $0 \leq v \leq 0.1$, respectively, wherein $y+z+w+v=1$, $M^2$ is Ni, Co or Fe, and p is $0.05 \leq p \leq 0.6$.

The lithium secondary battery according to the present disclosure includes a positive electrode including a positive electrode active material, a negative electrode including a negative electrode active material, a separator interposed between the positive electrode and the negative electrode, and the lithium salt-containing non-aqueous electrolyte composition of the present disclosure, which is described above.

Specifically, the positive electrode includes a positive electrode mixture layer formed by applying, drying, and pressing a positive electrode active material on a positive electrode current collector, and may selectively further include a conductive material, a binder, or other additives as needed.

Here, the positive electrode active material is a material that can cause an electrochemical reaction on the positive electrode current collector and may include one or more lithium metal oxides represented by Formula 2 and Formula 3, which enable reversible intercalation and deintercalation of lithium ions.

The lithium metal oxides represented by Formula 2 and Formula 3 are materials containing nickel (Ni) and manganese (Mn) at high contents, respectively, and have advantages of stably supplying high capacity and/or high voltage electricity when used as a positive electrode active material. In addition, the activation of the secondary battery requires a high charging potential of about 4.0V or more to form a coating film on the surface of the positive electrode and/or the negative electrode. Unlike the conventional positive electrode active materials with a charging potential of less than 4.0V such as iron phosphate, the lithium metal oxides have a high charging potential of about 4.0 or more, and thus, a coating film may be formed easily on the electrode.

Here, examples of the lithium metal oxides represented by Formula 2 may include $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, and $LiNi_{0.7}Co_{0.1}Mn_{0.1}Al_{0.1}O_2$, and examples of the lithium metal oxides represented by Formula 3 may include $LiNi_{0.7}Mn_{1.3}O_4$; $LiNi_{0.5}Mn_{1.5}O_4$; and $LiNi_{0.3}Mn_{1.7}O_4$, and these oxides may be used alone or in combination.

In addition, in the positive electrode, as a positive electrode current collector, a material that does not cause a chemical change in the corresponding battery and has high conductivity may be used. For example, stainless steel, aluminum, nickel, titanium, or calcined carbon may be used and in the case of aluminum or stainless steel, one that is surface treated with carbon, nickel, titanium or silver may also be used. In addition, the average thickness of the current collector may be suitably selected within 3 to 500 μm in consideration of the conductivity and total thickness of the positive electrode to be formed.

In addition, the negative electrode, like the positive electrode, includes a negative electrode mixture layer formed by applying, drying and pressing a negative electrode active material on a negative electrode current collector, and may selectively further include a conductive material, a binder, or other additives as needed.

The negative electrode active material may include a carbon material and a silicon material. Specifically, the carbon material refers to a material that has a carbon atom as the main component, and examples of the carbon materials may include one or more selected from the group consisting of natural graphite, artificial graphite, expanded graphite, non-graphitizing carbon, carbon black, acetylene black, and Ketjen black. In addition, the silicon material refers to a material that has a silicon atom as the main component, and may include silicon (Si), silicon carbide (SiC), silicon monoxide (SiO) or silicon dioxide ($SiO_2$) alone or in combination. When, as the silicon (Si)-containing materials, silicon monoxide (SiO) and silicon dioxide ($SiO_2$) are uniformly mixed or combined to be included in the negative electrode mixture layer, these materials may be represented as a silicon oxide ($SiO_q$, $0.8 \leq q \leq 2.5$).

In addition, the silicon material may be included at 1 to 20 wt %, and specifically, 3 to 10 wt %, 8 to 15 wt %, 13 to 18 wt %, or 2 to 8 wt % with respect to the total weight of the negative electrode active material. The present disclosure may maximize the energy density of the battery by controlling the content of the silicon material in the above content range.

In addition, the negative electrode current collector is not particularly limited as long as it has high conductivity without causing a chemical change in the battery, and for example, copper, stainless steel, nickel, titanium or calcined carbon may be used, and in the case of copper or stainless steel, one whose surface is treated with carbon, nickel, titanium or silver may be used. Furthermore, the average thickness of the negative electrode current collector may be suitably selected within 1 to 500 μm in consideration of the conductivity and total thickness of the negative electrode to be formed.

Meanwhile, the separator interposed between the positive electrode and the negative electrode of each unit cell is an insulating thin film having high ion permeability and high mechanical strength, and is not particularly limited as long as it is one that is commonly used in the art. Specifically, the separator may include one or more polymers selected from chemical-resistant and hydrophobic polypropylene, polyethylene and a polyethylene-propylene copolymer. The separator may have the form of a porous polymer substrate, such as a sheet or non-woven fabric including the above-described polymer, and in some cases, have the form of a composite separator in which organic or inorganic particles on the porous polymer substrate are coated with an organic binder. In addition, the separator may have an average pore diameter of 0.01 to 10 μm, and an average thickness of 5 to 300 μm.

Further, the secondary battery includes the above-described non-aqueous electrolyte composition according to the present disclosure as an electrolyte.

The electrolyte composition includes an ionic compound represented by Formula 1 below as an electrolyte additive, which has a mother nucleus to which a (meth)acrylate group or an acrylamide group is bonded via a functional group that has an alkylene structure of a saturated hydrocarbon chain or an ether group formed by introducing an oxygen atom to a saturated hydrocarbon chain, at one side based on a sulfonylimide group:

[Formula 1]

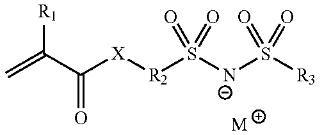

wherein, $R_1$ is hydrogen or an alkyl group having 1 to 4 carbon atoms, $R_2$ includes one or more selected from an alkylene group having 1 to 10 carbon atoms, an oxyalkylene group having 1 to 10 carbon atoms, a cycloalkylene group having 5 to 10 carbon atoms, and

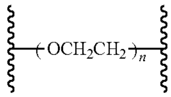, $R_3$ is a fluoro group, an alkyl group having 1 to 10 carbon atoms, an alkoxy group having 1 to 10 carbon atoms, or

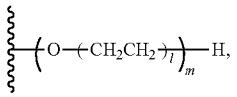, wherein one or more hydrogens included in the alkyl group, the alkylene group, the alkoxy group, the oxyalkylene group, the cycloalkylene group,

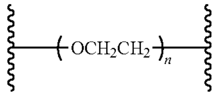 and 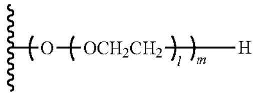

are optionally substituted with a fluorine atom,

X is an oxygen atom (O) or —$NR_4$, wherein $R_4$ is hydrogen or an alkyl group having 1 to 4 carbon atoms, M includes one or more selected from the group consisting of lithium, sodium, potassium, tetraalkyl ammonium having 1 to 4 carbon atoms, and tetraalkyl phosphonium having 1 to 4 carbon atoms, l is an integer of 1 to 6, and each of m and n is an integer of 2 to 20.

Since the compound has the structure represented by Formula 1, in the activation of a secondary battery including the same, an organic and/or inorganic coating film may be uniformly formed on the surface of a positive electrode and/or a negative electrode. To this end, the electrolyte additive may inhibit gas generation caused by the decomposition of the electrolyte when the battery is exposed to a high temperature, and improve the OCV drop phenomenon and capacity reduction of the battery, which occur at the positive electrode, resulting in further improvement in performance and high-temperature safety of the battery.

To this end, in the compound represented by Formula 1, $R_1$ is hydrogen, a methyl group, an ethyl group or a propyl group, $R_2$ includes one or more selected from a methylene group, an ethylene group, a propylene group, a butylene group, an oxymethylene group, an oxyethylene group, an oxypropylene group, an oxybutylene group, a cyclobutylene group, a cyclopentylene group, a cyclohexylene group, a cycloheptylene group,

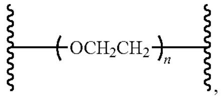, and 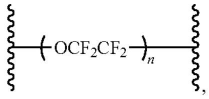, $R_3$ is a fluoro group, a methyl group, an ethyl group, a propyl group, a butyl group, a methoxy group, an ethoxy group, a propoxy group,

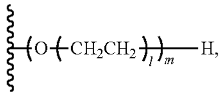 or 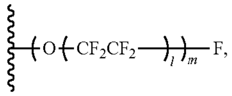

X is an oxygen atom (O), —NH, —$NCH_3$, or —$NCH_2CH_3$,

M includes one or more selected from the group consisting of lithium, sodium, tetramethyl ammonium having 1 to 4 carbon atoms, and tetraalkyl phosphonium having 1 to 4 carbon atoms, 1 is an integer of 1 to 6, and each of m and n is an integer of 2 to 20.

Specifically, $R_1$ may be hydrogen or a methyl group, $R_2$ comprises one or more selected from a methylene group, an ethylene group, a propylene group, an oxymethylene group, an oxyethylene group, an oxypropylene group, a cyclobutylene group, a cyclopentylene group, a cyclohexylene group, a cycloheptylene group,

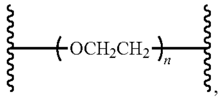, and 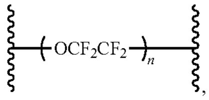, $R_3$ may be a fluoro group, a methyl group, an ethyl group, a propyl group, a methoxy group, an ethoxy group,

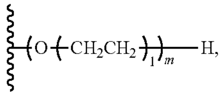 or 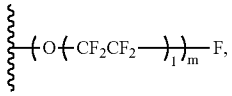

X may be an oxygen atom (O), —NH, or —$NCH_3$,

M may be lithium, 1 may be an integer of 1 or 2, and each of m and n may be an integer of 2 to 10.

In one example, the compound represented by Formula 1 may be any one or more compounds selected from Structural Formula 1 to Structural Formula 120:

Structural Formula 1

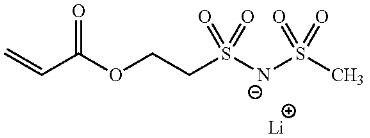

-continued

Structural Formula 2

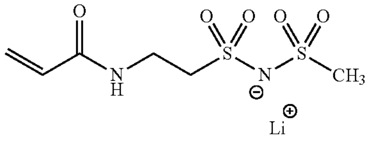

Structural Formula 3

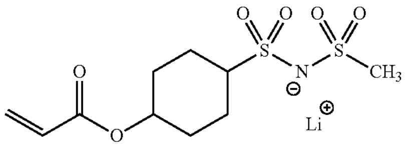

Structural Formula 4

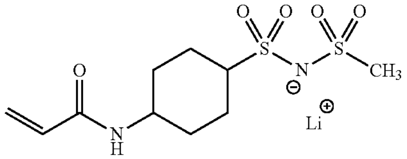

Structural Formula 5

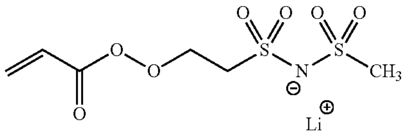

Structural Formula 6

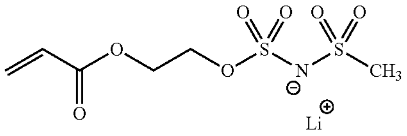

Structural Formula 7

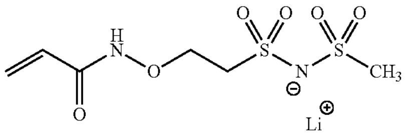

Structural Formula 8

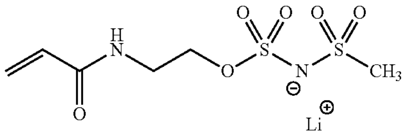

Structural Formula 9

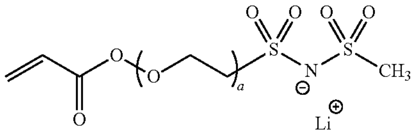

Structural Formula 10

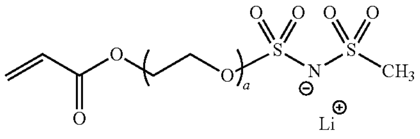

-continued

Structural Formula 11

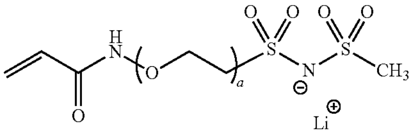

Structural Formula 12

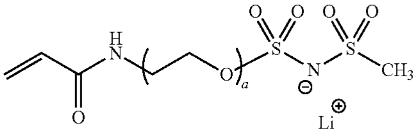

Structural Formula 13

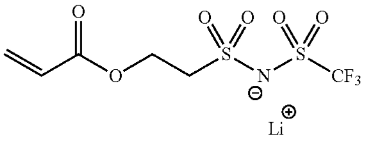

Structural Formula 14

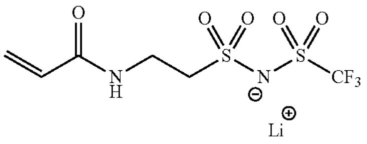

Structural Formula 15

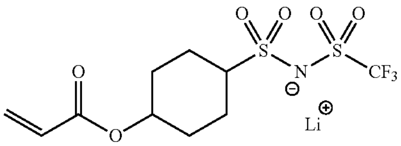

Structural Formula 16

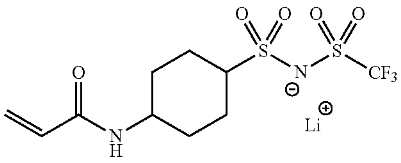

Structural Formula 17

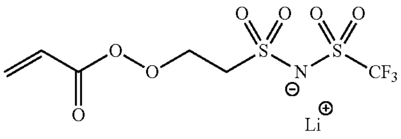

Structural Formula 18

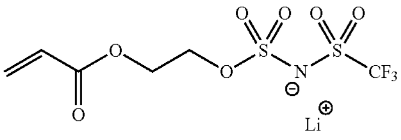

Structural Formula 19

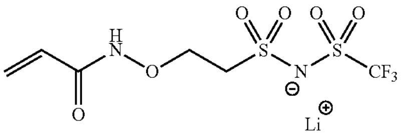

-continued

Structural Formula 20

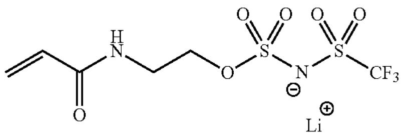

Structural Formula 21

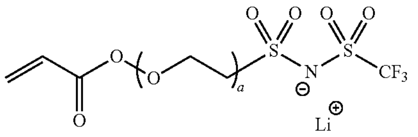

Structural Formula 22

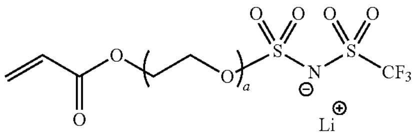

Structural Formula 23

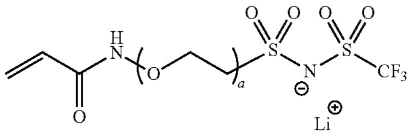

Structural Formula 24

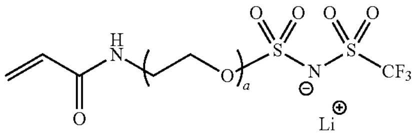

Structural Formula 25

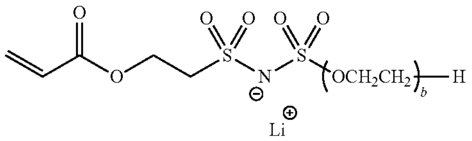

Structural Formula 26

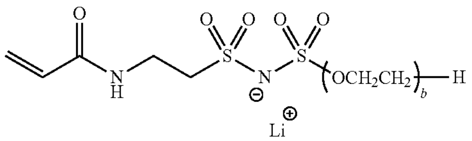

Structural Formula 27

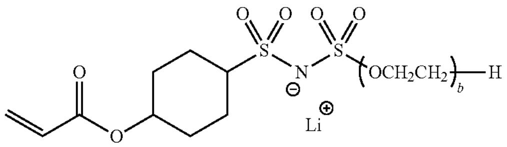

Structural Formula 28

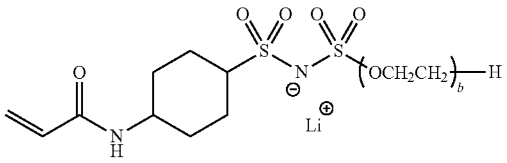

-continued

Structural Formula 29

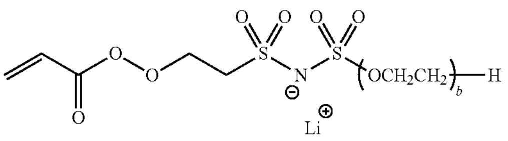

Structural Formula 30

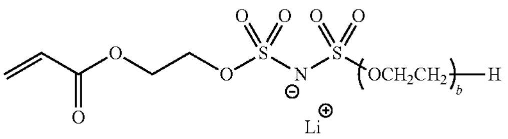

Structural Formula 31

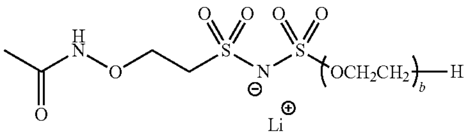

Structural Formula 32

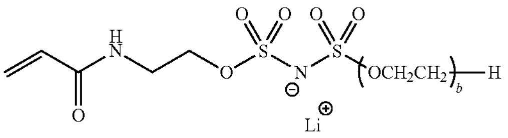

Structural Formula 33

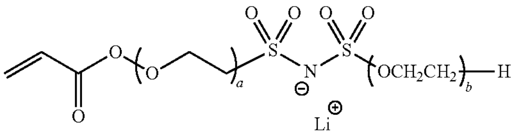

Structural Formula 34

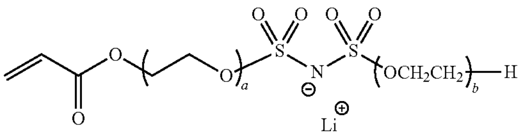

Structural Formula 35

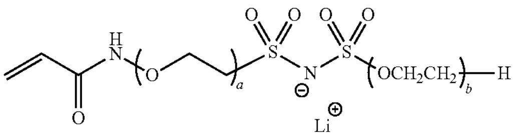

Structural Formula 36

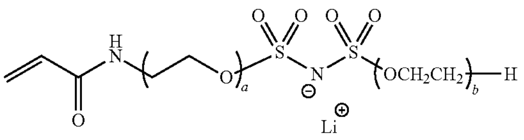

Structural Formula 37

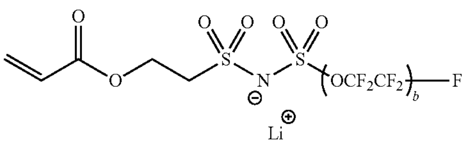

-continued

Structural Formula 38

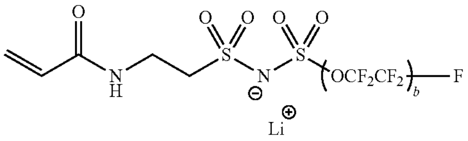

Structural Formula 39

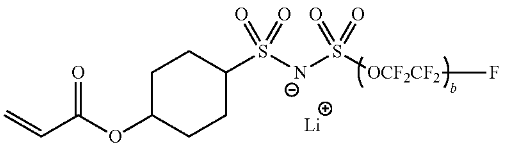

Structural Formula 40

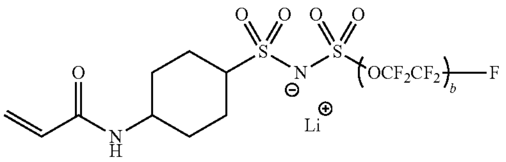

Structural Formula 41

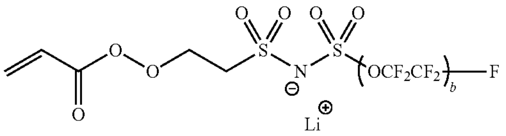

Structural Formula 42

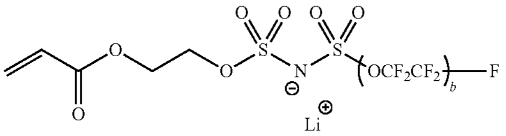

Structural Formula 43

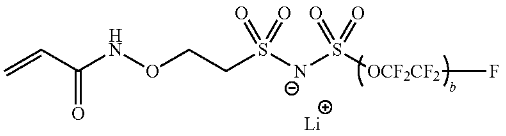

Structural Formula 44

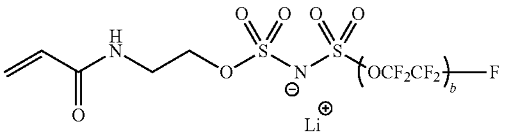

Structural Formula 45

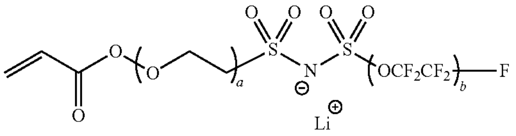

Structural Formula 46

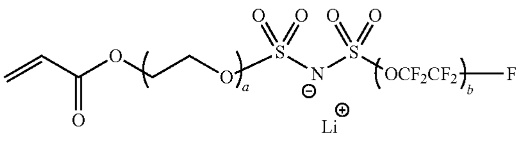

-continued

Structural Formula 47

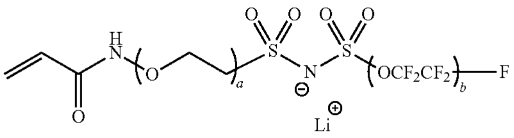

Structural Formula 48

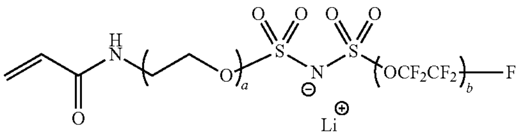

Structural Formula 49

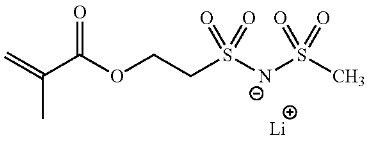

Structural Formula 50

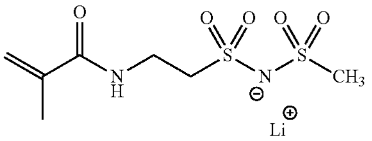

Structural Formula 51

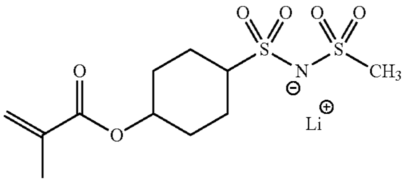

Structural Formula 52

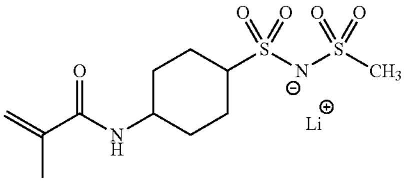

Structural Formula 53

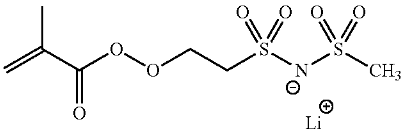

Structural Formula 54

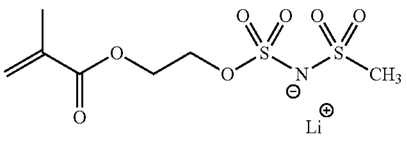

Structural Formula 55

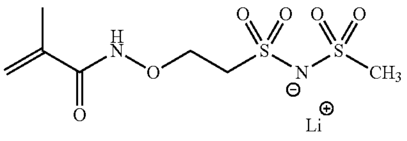

-continued

Structural Formula 56

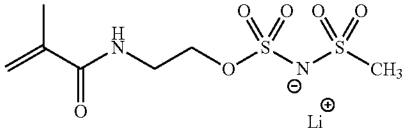

Structural Formula 57

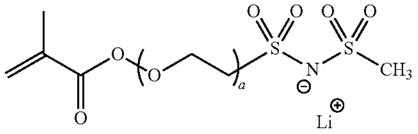

Structural Formula 58

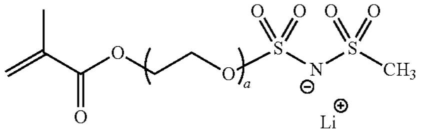

Structural Formula 59

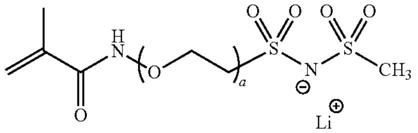

Structural Formula 60

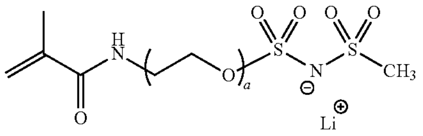

Structural Formula 61

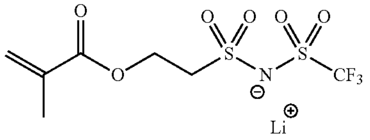

Structural Formula 62

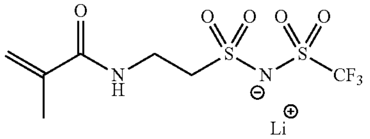

Structural Formula 63

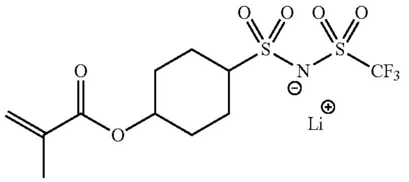

Structural Formula 64

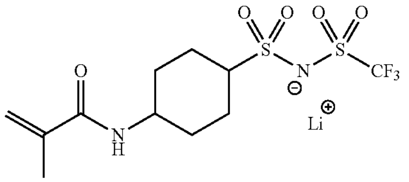

-continued

Structural Formula 65

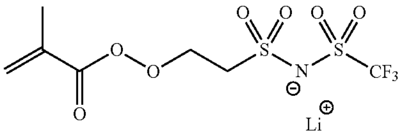

Structural Formula 66

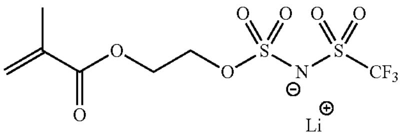

Structural Formula 67

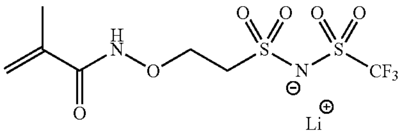

Structural Formula 68

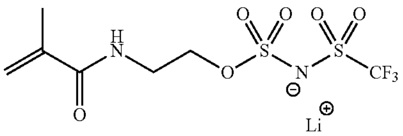

Structural Formula 69

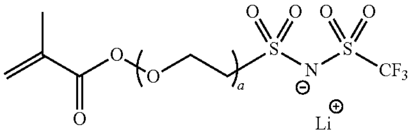

Structural Formula 70

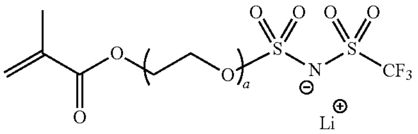

Structural Formula 71

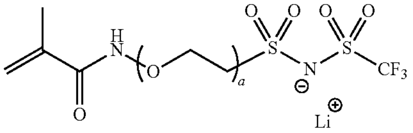

Structural Formula 72

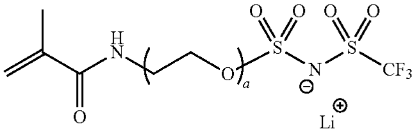

Structural Formula 73

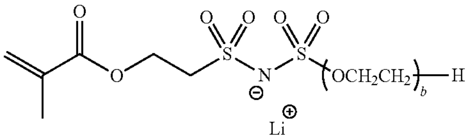

-continued

Structural Formula 74

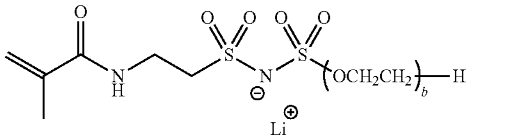

Structural Formula 75

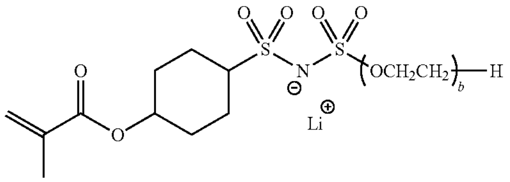

Structural Formula 76

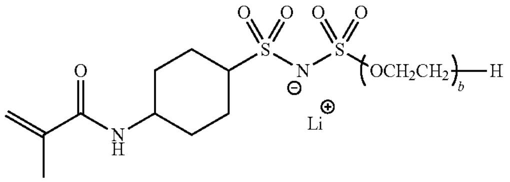

Structural Formula 77

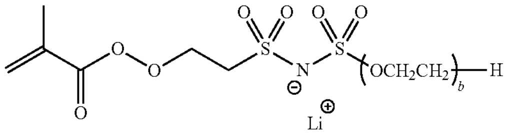

Structural Formula 78

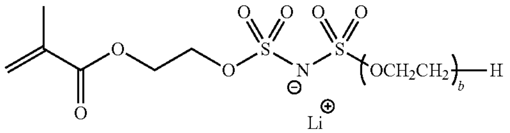

Structural Formula 79

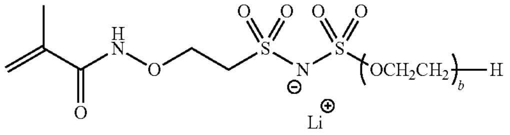

Structural Formula 80

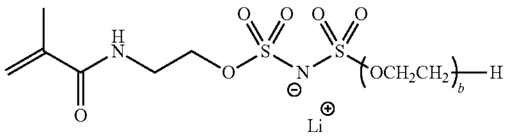

Structural Formula 81

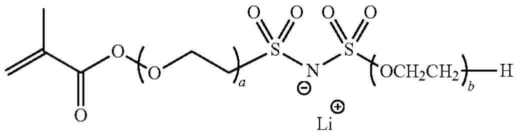

Structural Formula 82

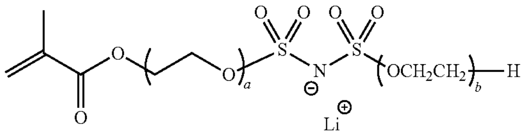

-continued

Structural Formula 83

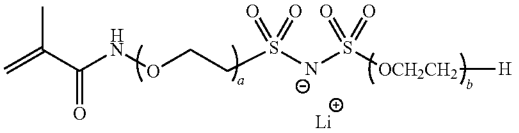

Structural Formula 84

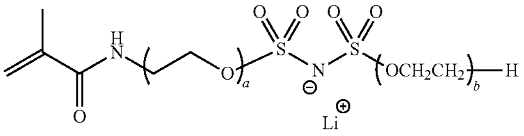

Structural Formula 85

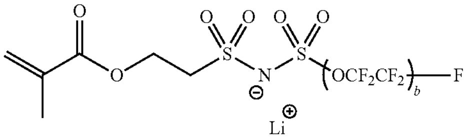

Structural Formula 86

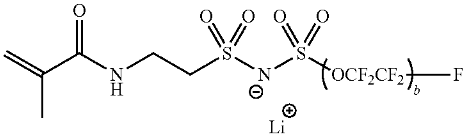

Structural Formula 87

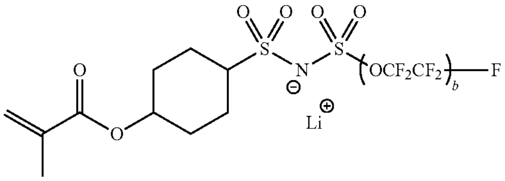

Structural Formula 88

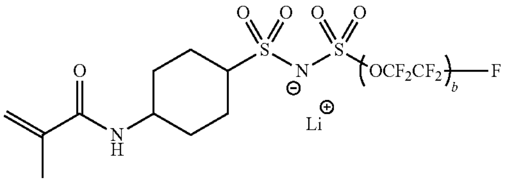

Structural Formula 89

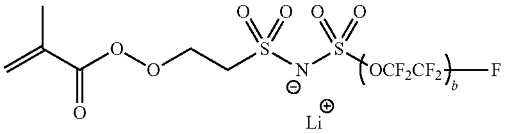

Structural Formula 90

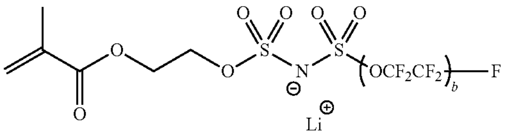

Structural Formula 91

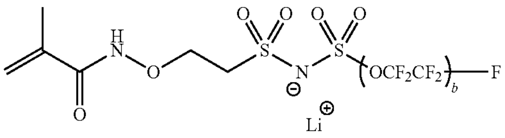

-continued

Structural Formula 92

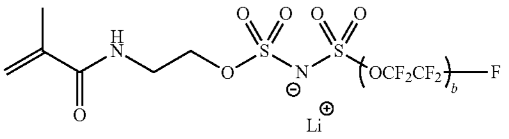

Structural Formula 93

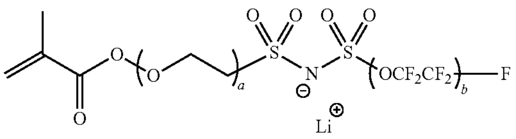

Structural Formula 94

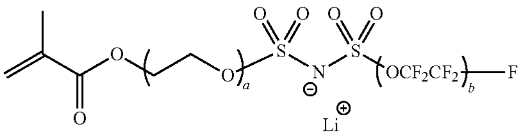

Structural Formula 95

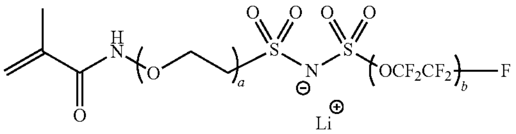

Structural Formula 96

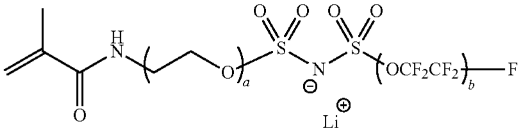

Structural Formula 97

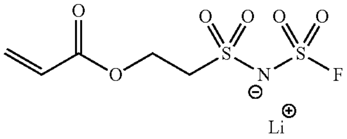

Structural Formula 98

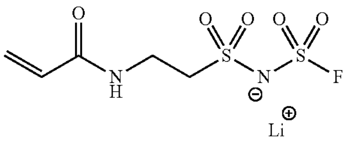

Structural Formula 99

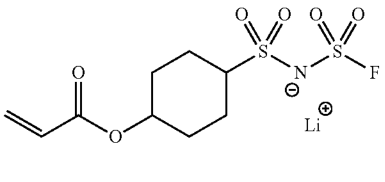

Structural Formula 100

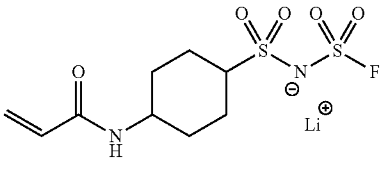

-continued

Structural Formula 101

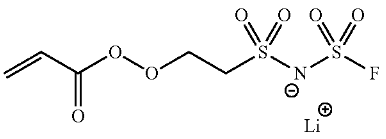

Structural Formula 102

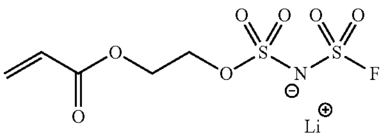

Structural Formula 103

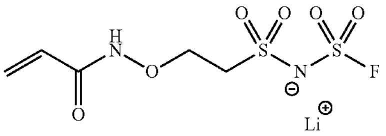

Structural Formula 104

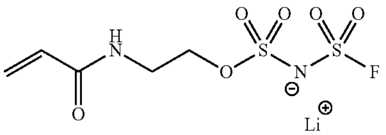

Structural Formula 105

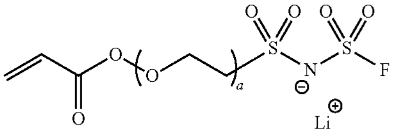

Structural Formula 106

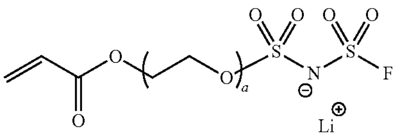

Structural Formula 107

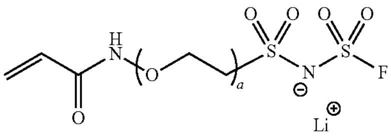

Structural Formula 108

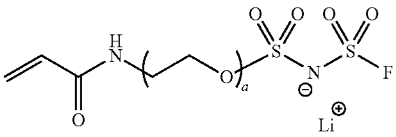

Structural Formula 109

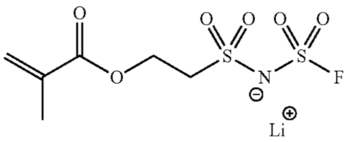

-continued

Structural Formula 110

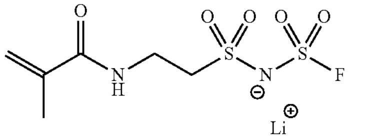

Structural Formula 111

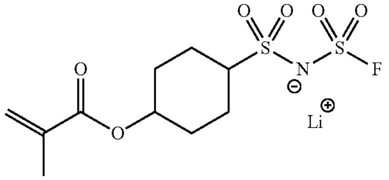

Structural Formula 112

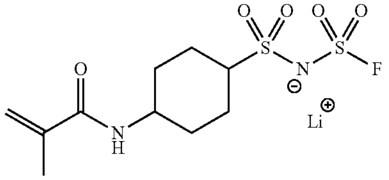

Structural Formula 113

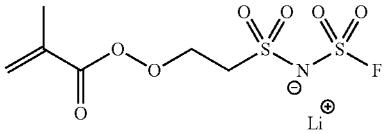

Structural Formula 114

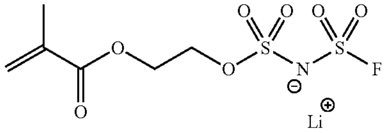

Structural Formula 115

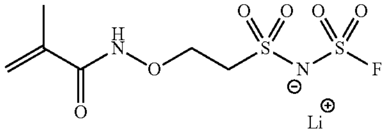

Structural Formula 116

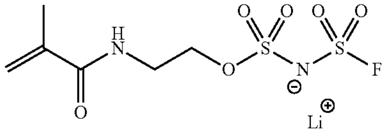

Structural Formula 117

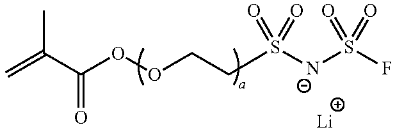

Structural Formula 118

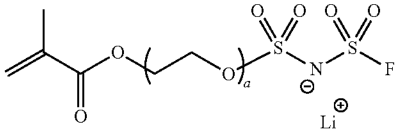

-continued

Structural Formula 119

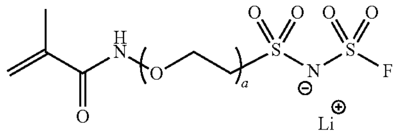

Structural Formula 120

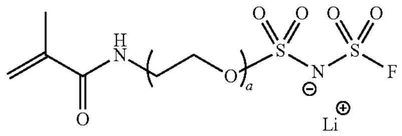

In Structural Formula 9~12, 21~48, 57~60, 69~96, 105~108, and 117~120 a and b is an integer of 2 to 4 respectively.

Hereinafter, the present disclosure will be described in further detail with reference to examples and experimental examples.

However, the following examples and experimental example merely illustrate the present disclosure, and the content of the present disclosure is not limited to the following examples and experimental examples.

Examples 1 to 6 and Comparative Examples 1 to 5. Preparation of Electrolyte Composition for Lithium Secondary Battery A non-aqueous electrolyte composition was prepared by dissolving 1M $LiPF_6$ as a lithium salt in a solvent in which ethylene carbonate (EC) and ethyl methyl carbonate (EMC) were mixed in a volume ratio of 3:7, and dissolving an additive to be 2 wt % with respect to the total weight of the electrolyte as shown in Table 1 below.

TABLE 1

| | Type of non-aqueous electrolyte additive |
|---|---|
| Example 1 | < Structural Formula 61 > 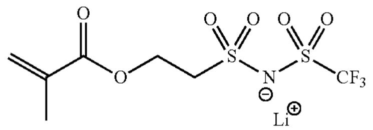 [SMILES: C=C(C)C(=O)OCCS(=O)(=O)[N-]S(=O)(=O)C(F)(F)F ; [Li+]] |
| Example 2 | < Structural Formula 62> 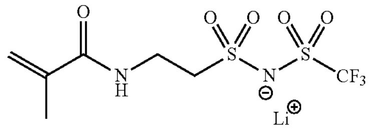 [SMILES: C=C(C)C(=O)NCCS(=O)(=O)[N-]S(=O)(=O)C(F)(F)F ; [Li+]] |
| Example 3 | < Structural Formula 63 > 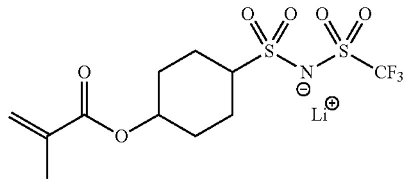 [SMILES: C=C(C)C(=O)OC1CCC(S(=O)(=O)[N-]S(=O)(=O)C(F)(F)F)CC1 ; [Li+]] |

TABLE 1-continued

| | Type of non-aqueous electrolyte additive |
|---|---|
| Example 4 | < Structural Formula 65 > 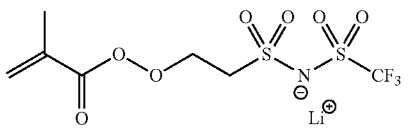 [SMILES: C=C(C)C(=O)OOCCS(=O)(=O)[N-]S(=O)(=O)C(F)(F)F ; [Li+]] |
| Example 5 | <Structural Formula 69> 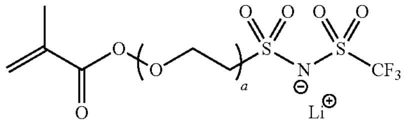 a = 2~4 |
| Example 6 | < Structural Formula 85 > 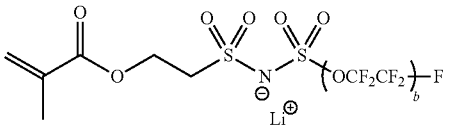 |
| Comparative Example 1 | Not added |
| Comparative Example 2 | <Structural Formula 121 > 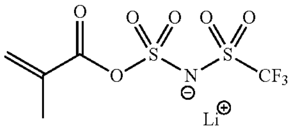 [SMILES: C=C(C)C(=O)OS(=O)(=O)[N-]S(=O)(=O)C(F)(F)F ; [Li+]] |
| Comparative Example 3 | <Structural Formula 122> 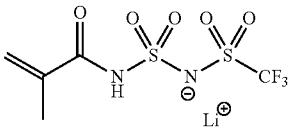 [SMILES: C=C(C)C(=O)NS(=O)(=O)[N-]S(=O)(=O)C(F)(F)F ; [Li+]] |
| Comparative Example 4 | <Structural Formula 123> 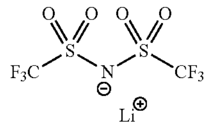 |
| Comparative Example 5 | <Structural Formula 124> 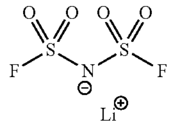 |

Comparative Example 6. Preparation of Electrolyte Composition for Lithium Secondary Battery A non-aqueous electrolyte composition was manufactured by in the same manner as in the Example 1, except that an oligomer (Number average molecular weight and weight-average molecular weight: 2,500~5,000) polymerized from the compound represented by Structural Formula 61 was used instead of the compound represented by Structural Formula 61 as the electrolyte additive.

Examples 7 to 12 and Comparative Examples 7 to 12. Manufacture of Lithium Secondary Battery A positive electrode was manufactured by preparing $LiNi_{0.5}Mn_{1.5}O_4$ having a particle size of 5 μm as a positive electrode active material, preparing a slurry by mixing the positive electrode active material with a carbon-based conductive material and polyvinylidene fluoride as a binder in a weight ratio of 94:3:3 in N-methyl pyrrolidone (NMP), casting the slurry on an aluminum thin film, drying the slurry in a vacuum oven at 120° C., and rolling the resultant.

Separately, a negative electrode was manufactured by preparing a negative electrode active material in which artificial graphite and silicon oxide ($SiO_2$) were mixed in a weight ratio of 9:1, preparing a slurry by mixing 97 parts by weight of the negative electrode active material and 3 parts by weight of styrene butadiene rubber (SBR) with water, casting the slurry on a copper thin film, drying the slurry in a vacuum oven at 130° C., and rolling the resultant.

A lithium secondary battery was manufactured by interposing a separator consisting of 18-μm polypropylene between the positive electrode and negative electrode obtained above, inserting the resultant into a case, and injecting each of the electrolyte compositions prepared in each of Examples 1 to 6 and Comparative Examples 1 to 6 as shown in Table 2 below.

TABLE 2

| | Type of electrolyte composition |
|---|---|
| Example 7 | Electrolyte composition of Example 1 |
| Example 8 | Electrolyte composition of Example 2 |
| Example 9 | Electrolyte composition of Example 3 |
| Example 10 | Electrolyte composition of Example 4 |
| Example 11 | Electrolyte composition of Example 5 |
| Example 12 | Electrolyte composition of Example 6 |
| Comparative Example 7 | Electrolyte composition of Comparative Example 1 |
| Comparative Example 8 | Electrolyte composition of Comparative Example 2 |
| Comparative Example 9 | Electrolyte composition of Comparative Example 3 |
| Comparative Example 10 | Electrolyte composition of Comparative Example 4 |
| Comparative Example 11 | Electrolyte composition of Comparative Example 5 |
| Comparative Example 12 | Electrolyte composition of Comparative Example 6 |

Experimental Example 1

To analyze the form in which the electrolyte composition for a lithium secondary battery is present in a secondary battery, the following experiment was performed on the electrolyte compositions prepared in Example 1 and Comparative Example 1, respectively.

Raman Spectroscopy

Raman spectroscopy was performed on each electrolyte composition (5 ml) using 532-mm laser at a wavelength range of 650 to 760 $cm^{-1}$. The result is shown in FIG. 1.

Referring to FIG. 1, it was confirmed that, compared with the electrolyte composition prepared in Comparative Example 1 not including an electrolyte additive, the electrolyte composition of Example 1 including the electrolyte additive represented by Formula 1 according to the present disclosure has an increased Raman spectrum band intensity in the vicinity of 743±1 $cm^{-1}$. This is a phenomenon that occurs by forming a coordinate bond between ionic materials such as a negatively charged nitrogen atom included in sulfonylimide and a positively-charged lithium ion (Lit) of the electrolyte additive represented by Formula 1, indicating that there is an ionic compound in the electrolyte composition of Example 1. In addition, the increase in band intensity indicates that the ionic compound can cause a reduction reaction on the surface of a negative electrode.

Differential Capacity Curve Analysis of Half-Cell

A half-cell was manufactured using lithium metal and graphite (mixture of artificial graphite:natural graphite=9:1 (weight ratio)), and each of the electrolyte compositions prepared in Example 1 and Comparative Example 1 was injected into the half-cell. Afterward, after charging the half-cell at 25° C. from 3.5±0.5V to 0.05V at a rate of 0.005 C, a potential value (V) and a capacity value (mAh) were measured, and a reduction potential value was determined by differentiating the capacitance value with respect to the potential value (dQ/dV). The result is shown in FIG. 2.

Referring to FIG. 2, it was confirmed that the electrolyte composition of Example 1 including the electrolyte additive represented by Formula 1 according to the present disclosure, unlike the electrolyte composition of Comparative Example 1 not including an electrolyte additive, shows a descending peak at a voltage near 1.32V compared to lithium. The descending peak indicates that a reduction reaction occurred on the graphite surface, which is the negative electrode, and the electrolyte additive represented by Formula 1 contained in the electrolyte composition is converted into a coating material through a reduction reaction on the surface of the negative electrode at approximately 1.32V compared to lithium.

Evaluation of Linear Sweep Voltammetry for Three-Electrode Battery

A three-electrode battery was prepared by injecting each of the electrolyte compositions prepared in Example 1 and Comparative Example 1, which includes three electrodes including two platinum electrodes and a lithium metal electrode, and linear sweep voltammetry (LSV) was performed thereon. Here, LSV was performed under the conditions of an observation range of 3.0 to 6.0V (based on lithium), a step voltage of 50 mV and a measurement rate of 50 mV/s. The result is shown in FIG. 3.

Referring to FIG. 3, it can be seen that the electrolyte composition of Example 1 including the electrolyte additive represented by Formula 1 according to the present disclosure has an increased current near 4.2V compared to lithium. This means that there is an oxidation reaction on the lithium metal surface near 4.2V, and indicates that the electrolyte additive included in the electrolyte composition of Example 1 forms a coating film through an oxidation reaction on the surface of a positive electrode under a condition of 4.2V or more, compared to lithium. In addition, it shows that the oxidation reaction is induced at a lower potential than the surface of the platinum electrode in a carbon electrode or a positive electrode, due to the catalytic properties of carbon or a transition metal.

From the above results, it can be seen that the electrolyte additive according to the present disclosure is an ionic material, which has an oxidation reaction and a reduction reaction at the positive electrode and the negative electrode, respectively, during charging/discharging of the electrode, thereby forming a coating film on the surface of each electrode.

Experimental Example 2

To analyze a coating film formed on an electrode surface in the activation of a lithium secondary battery according to the present disclosure and evaluate the high-temperature safety of the lithium secondary battery, the following experiment was performed. Here, the targeted lithium secondary batteries were the secondary batteries of Examples 13 to 18 and Comparative Examples 13 to 18 manufactured in the same manner as in Examples 7 to 12 and Comparative Examples 7 to 12, except that $LiNi_{0.6}Co_{0.2}Mn_{0.2}O_2$ and artificial graphite were used.

Analysis of Coating Film on Electrode Surface

The secondary batteries of Example 13, Comparative Example 16 and Comparative Example 18 were charged/discharged three times at a charge/discharge current density of 0.33 C/0.33 C, a final charging voltage of 4.2V (NMC/graphite) and a final discharging voltage of 2.5V (NMC/graphite), and X-ray photoelectron spectroscopy (XPS) was performed on the surfaces of the positive and negative electrodes of each battery at full charge. The results are shown in FIGS. 4A to 4B and 5A to 5B.

Referring to FIGS. 4A-4B and 5A-5B, it showed that the secondary battery (Example 13) including the electrolyte composition of Example 1 shows peaks in the range of 280 to 300 eV indicating the carbon-fluorine binding energy at the positive and negative electrodes in X-ray photoelectron spectroscopy (XPS) performed on the electrode surface. Specifically, the positive and negative electrodes of the secondary battery showed peaks indicating the binding energy of a $CF_3$ group at 293±0.2 eV, which means that the electrolyte additive represented by Formula 1 contained in the electrolyte composition is involved in the formation of a coating film formed on the surfaces of the positive and negative electrodes. On the other hand, it was confirmed that the secondary battery (Comparative Example 13) using the electrolyte composition of Comparative Example 1 not including an electrolyte additive; the secondary battery (Comparative Example 16) using the electrolyte composition of Comparative Example 4 which includes the additive including sulfonylimide; the secondary battery (Comparative Example 18) using the electrolyte composition of Comparative Example 6 including the electrolyte additive in the form of oligomer do not show the binding energy peak derived from the $CF_3$ group at both of the positive and negative electrodes.

From the above results, it can be seen that, as the electrolyte additive according to the present disclosure includes an ionic compound in the form of monomolecular (or monomer) represented by Formula 1 including a mother nucleus to which a (meth)acrylate group or an acrylamide group is bonded via a functional group that has an alkylene structure of a saturated hydrocarbon chain or an ether group formed by introducing an oxygen atom to a saturated hydrocarbon chain, at one side based on a sulfonylimide group, a coating film which includes the ionic compound may be formed on the surface of an electrode in the activation of a secondary battery.

Evaluation of High-Temperature Storage Stability of Secondary Battery

While each secondary battery was stored at 60° C. for 56 days, ① an amount of gas generation in the secondary battery and ② OCV of the secondary battery were observed over time. And ③ capacity retention rates of each secondary battery after high-temperature storage were assessed.

Specifically, each secondary battery was charged/discharged three times at a charge/discharge current density of 0.33 C/0.33 C, a final charging voltage of 4.2V (NMC/graphite), and a final discharging voltage of 2.5V (NMC/graphite) to measure a battery capacity.

Afterward, each secondary battery was fully charged with 0.33 C at a final charging voltage of 4.2V in a CC/CV mode, followed by starting high temperature storage. Here, the high temperature storage was to store the battery in a constant temperature chamber at 60° C. for a total of 56 days. Also, while each secondary battery was stored at 60° C. for 56 days, an amount of gas generation in the secondary battery and open-circuit voltage (OCV) of the secondary battery were observed over time. The OCV is measured using HOIKI (OCV measuring device, model: BT3554). And the volume of gas generated in the secondary battery was calculated using the Archimedes principle.

After 56 days, the OCV deviation (i.e., the degree of OCV drop) and the total volume of gas generated in the secondary battery was calculated. In addition, each secondary battery was charged/discharged at a charge/discharge current density of 0.33 C/0.33 C, a final charging voltage of 4.2V (NMC/graphite), and a final discharging voltage of 2.5V (NMC/graphite) to measure a battery capacity. And the capacity retention rates of each secondary battery after high-temperature storage were assessed from the measured values. The result is shown in Table 3 below.

TABLE 3

| | Type of electrolyte additive used | OCV deviation [mV] | Capacity retention rate [%] | Amount of gas generation [μl] |
|---|---|---|---|---|
| Example 13 | 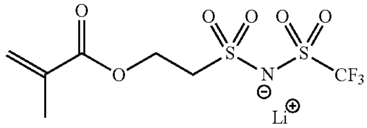 [SMILES: C=C(C)C(=O)OCCS(=O)(=O)[N-]S(=O)(=O)C(F)(F)F ; [Li+]] | 33.3 | 98.0 | 1302 |
| Example 14 | 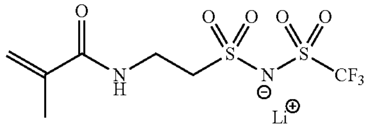 [SMILES: C=C(C)C(=O)NCCS(=O)(=O)[N-]S(=O)(=O)C(F)(F)F ; [Li+]] | 33.4 | 97.9 | 1360 |
| Example 15 | 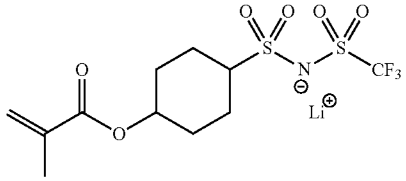 [SMILES: C=C(C)C(=O)OC1CCC(S(=O)(=O)[N-]S(=O)(=O)C(F)(F)F)CC1 ; [Li+]] | 33.6 | 97.9 | 1418 |
| Example 16 | 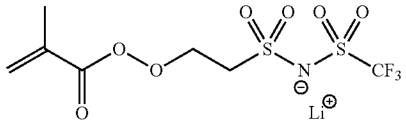 [SMILES: C=C(C)C(=O)OOCCS(=O)(=O)[N-]S(=O)(=O)C(F)(F)F ; [Li+]] | 34.0 | 97.3 | 1441 |
| Example 17 | 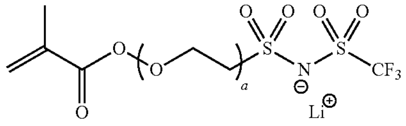 a = 2~4 | 33.8 | 97.5 | 1380 |
| Example 18 | 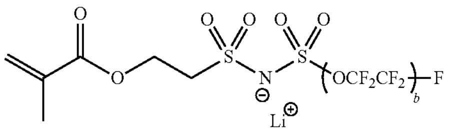 | 34.2 | 97.2 | 1402 |
| Comparative Example 13 | Not added | 38.5 | 95.6 | 2023 |
| Comparative Example 14 | 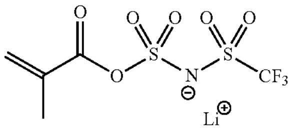 [SMILES: C=C(C)C(=O)OS(=O)(=O)[N-]S(=O)(=O)C(F)(F)F ; [Li+]] | 40.0 | 95.0 | 1710 |

TABLE 3-continued

| | Type of electrolyte additive used | OCV deviation [mV] | Capacity retention rate [%] | Amount of gas generation [μl] |
|---|---|---|---|---|
| Comparative Example 15 | 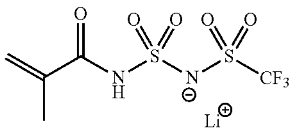 [SMILES: C=C(C)C(=O)NS(=O)(=O)[N-]S(=O)(=O)C(F)(F)F ; [Li+]] | 39.6 | 95.4 | 1943 |
| Comparative Example 16 | 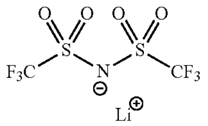 | 38.1 | 95.8 | 1943 |
| Comparative Example 17 | 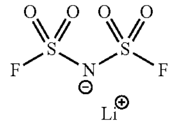 | 39.6 | 96.1 | 1928 |
| Comparative Example 18 | Oligomer originates from <Structural Formula 61 > | 39.2 | 95.7 | 1877 |

As shown in Table 3, in the secondary batteries of Examples including the compound represented by Formula 1 as an electrolyte additive according to the present disclosure, it can be seen that, even when being exposed to a high temperature condition, due to the coating film formed on the surfaces of the positive and negative electrodes, the amount of gas generated is significantly reduced by lowering the decomposition of the electrolyte, and the OCV drop phenomenon occurring at the positive electrode decreases.

As above, the present disclosure has been described with reference to exemplary embodiments, but it should be understood by those killed in the art or those of ordinary skill in the art that the present disclosure can be variously modified and changed without departing from the spirit and technical scope of the present disclosure described in the accompanying claims.

Accordingly, the technical scope of the present disclosure is not limited to the content described in the detailed description of the specification, but should be defined by the claims.

The invention claimed is:

1. An electrolyte additive for a secondary battery, comprising:

a compound represented by Formula 1:

[Formula 1]

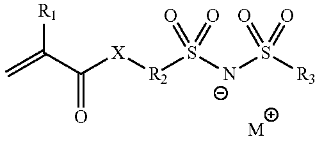

wherein, $R_1$ is hydrogen or an alkyl group having 1 to 4 carbon atoms, $R_2$ includes one or more selected from an alkylene group having 1 to 10 carbon atoms, an oxyalkylene group having 1 to 10 carbon atoms, a cycloalkylene group having 5 to 10 carbon atoms, or

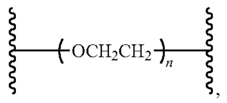, each of which is are optionally substituted with a fluorine atom, $R_3$ is a fluoro group, an alkyl group having 1 to 10 carbon atoms optionally substituted with a fluorine atom, an alkoxy group having 1 to 10 carbon atoms optionally substituted with a fluorine atom, or

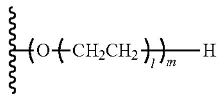

optionally substituted with a fluorine atom, provided when $R_2$ is an alkylene group having 1 to 10 carbon atoms, $R_3$ is not an alkyl group having 1 to 10 carbon atoms substituted with a fluorine atom, X is an oxygen atom (O) or —$NR_4$, $R_4$ is hydrogen or an alkyl group having 1 to 4 carbon atoms, M includes one or more of lithium, sodium, potassium, tetraalkyl ammonium having 1 to 4 carbon atoms, or tetraalkyl phosphonium having 1 to 4 carbon atoms, l is an integer of 1 to 6, and each of m and n is an integer of 2 to 20.

2. The electrolyte additive of claim 1, wherein $R_1$ is hydrogen or a methyl group, $R_2$ comprises one or more selected from a methylene group, an ethylene group, a propylene group, an oxymethylene group, an oxyethylene group, an oxypropylene group, a cyclobutylene group, a cyclopentylene group, a cyclohexylene group, a cycloheptylene group,

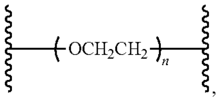

or

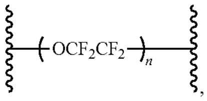

$R_3$ is a fluoro group, a methyl group, an ethyl group, a propyl group, a methoxy group, an ethoxy group,

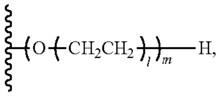

or

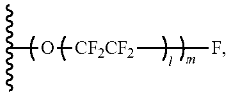

X is an oxygen atom (O), —NH, or —$NCH_3$,

M is lithium, l is an integer of 1 or 2, and each of m and n is an integer of 2 to 10.

3. The electrolyte additive of claim 1, wherein the compound is represented by any one of Structural Formulas below:

Structural Formula 1

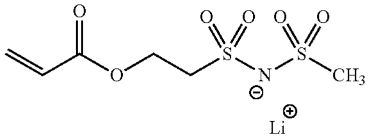

Structural Formula 2

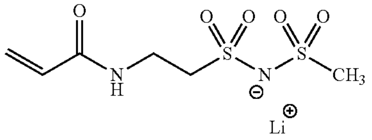

Structural Formula 3

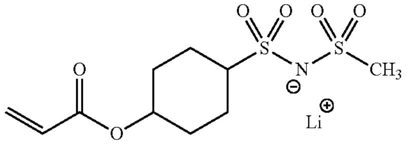

Structural Formula 4

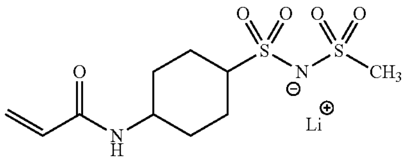

Structural Formula 5

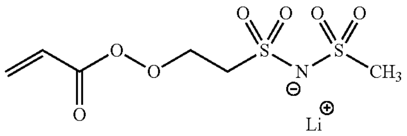

Structural Formula 6

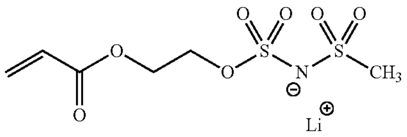

-continued

Structural Formula 7

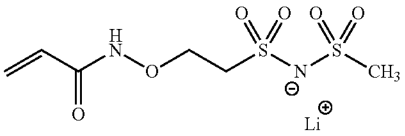

Structural Formula 8

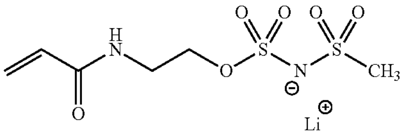

Structural Formula 9

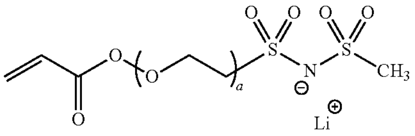

Structural Formula 10

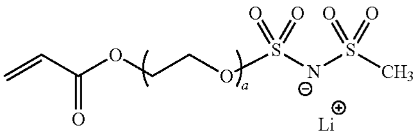

Structural Formula 11

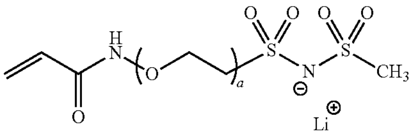

Structural Formula 12

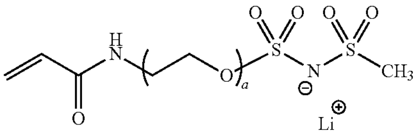

Structural Formula 15

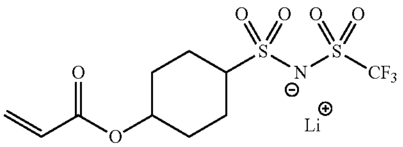

Structural Formula 16

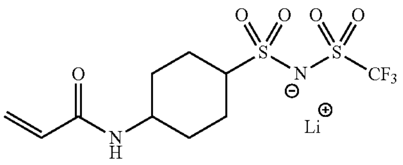

Structural Formula 17

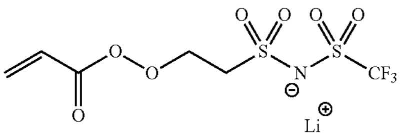

-continued

Structural Formula 18

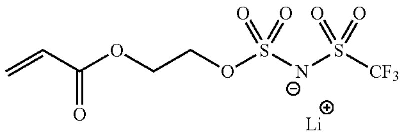

Structural Formula 19

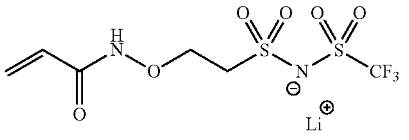

Structural Formula 20

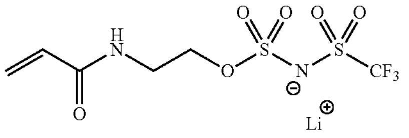

Structural Formula 21

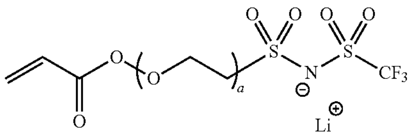

Structural Formula 20

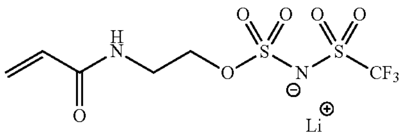

Structural Formula 22

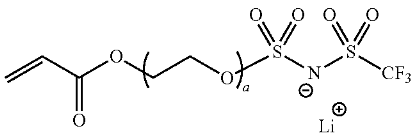

Structural Formula 23

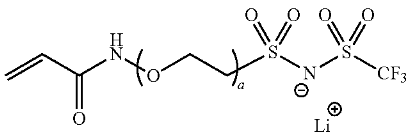

Structural Formula 24

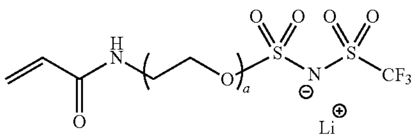

Structural Formula 25

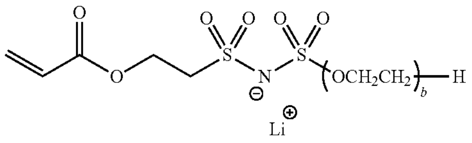

-continued

Structural Formula 26

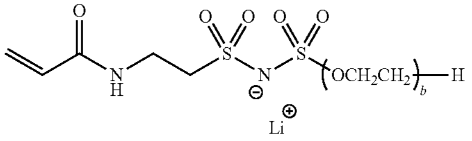

Structural Formula 27

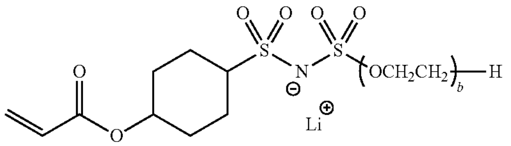

Structural Formula 28

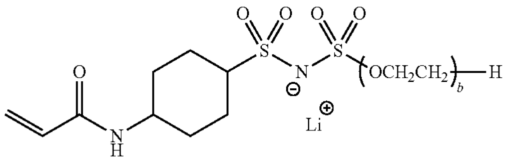

Structural Formula 29

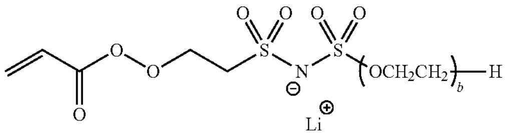

Structural Formula 30

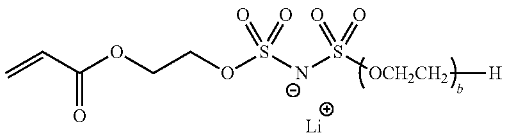

Structural Formula 31

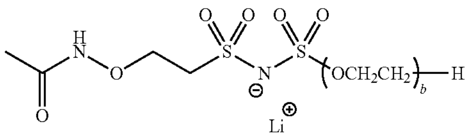

Structural Formula 32

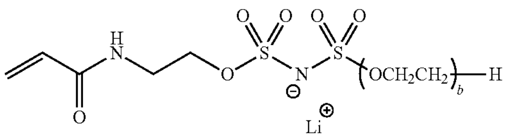

Structural Formula 33

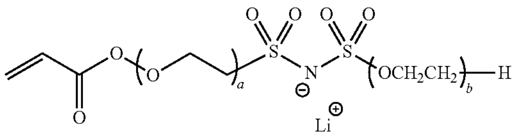

Structural Formula 34

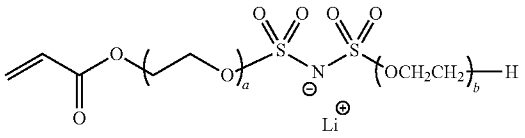

-continued

Structural Formula 35

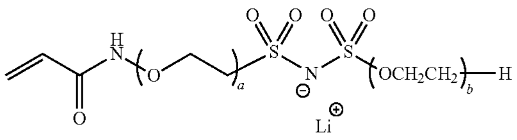

Structural Formula 36

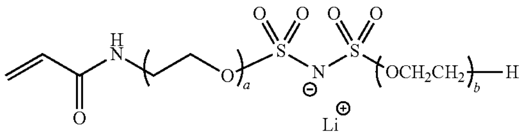

Structural Formula 37

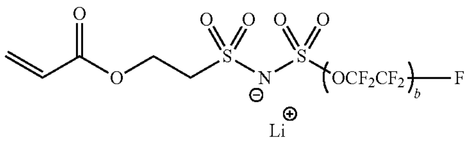

Structural Formula 38

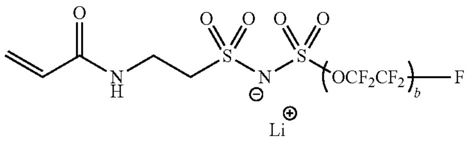

Structural Formula 39

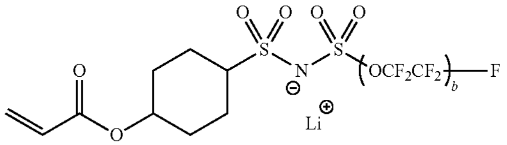

Structural Formula 40

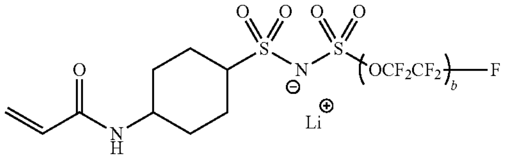

Structural Formula 41

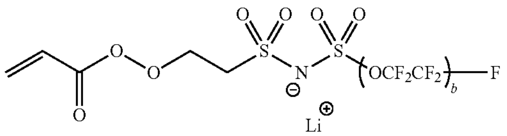

Structural Formula 42

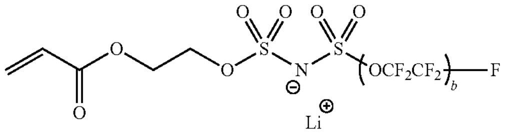

Structural Formula 43

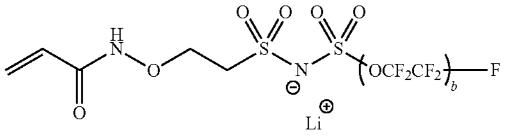

-continued

Structural Formula 44

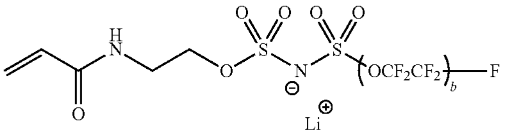

Structural Formula 45

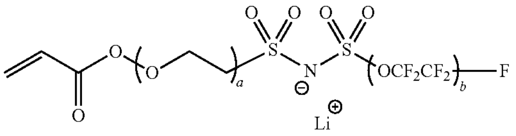

Structural Formula 46

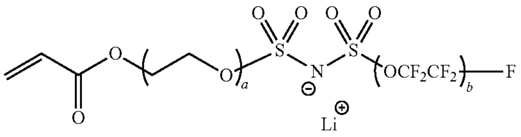

Structural Formula 47

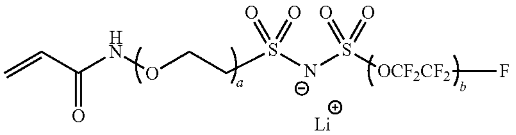

Structural Formula 48

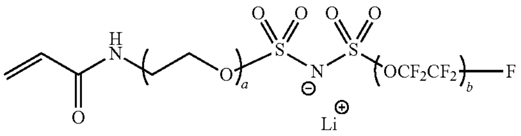

Structural Formula 49

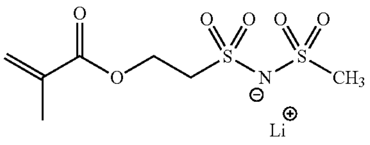

Structural Formula 50

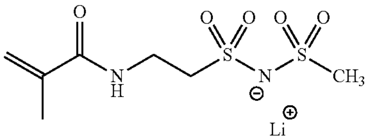

Structural Formula 51

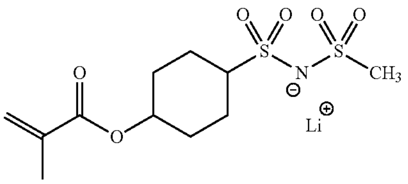

Structural Formula 52

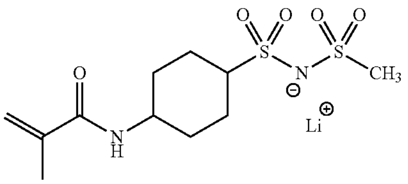

-continued

Structural Formula 53

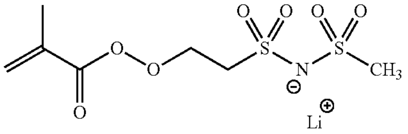

Structural Formula 54

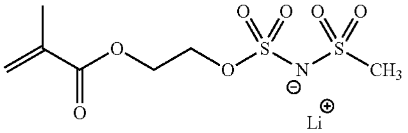

Structural Formula 55

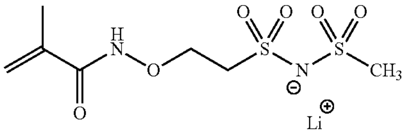

Structural Formula 56

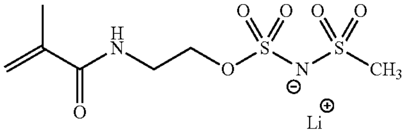

Structural Formula 57

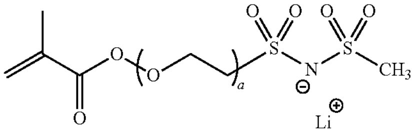

Structural Formula 58

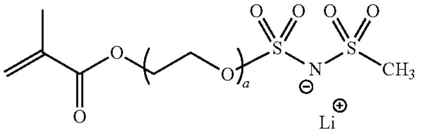

Structural Formula 59

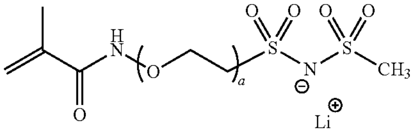

Structural Formula 60

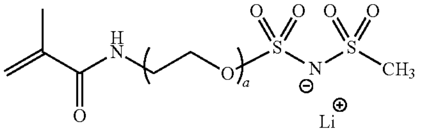

Structural Formula 63

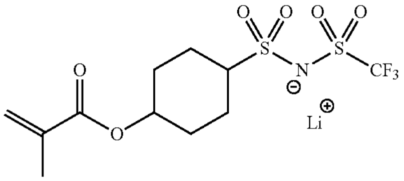

-continued

Structural Formula 64

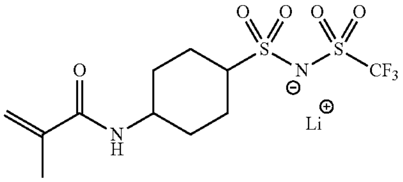

Structural Formula 65

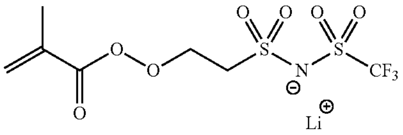

Structural Formula 66

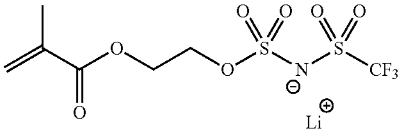

Structural Formula 67

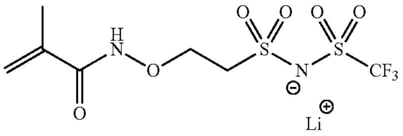

Structural Formula 68

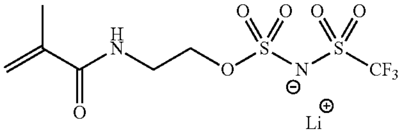

Structural Formula 69

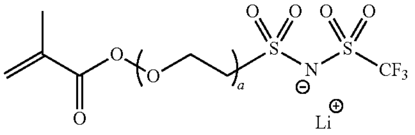

Structural Formula 70

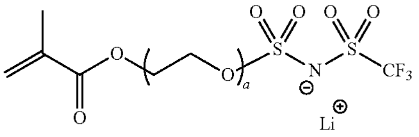

Structural Formula 71

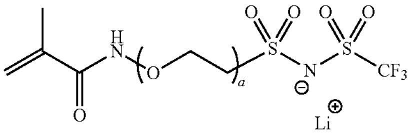

Structural Formula 72

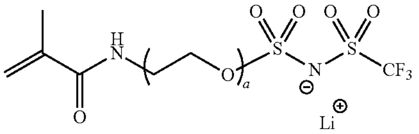

-continued

Structural Formula 73

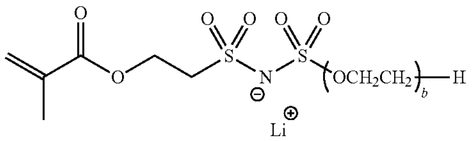

Structural Formula 74

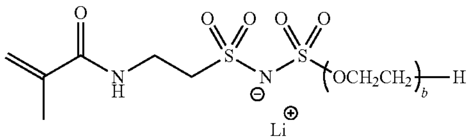

Structural Formula 75

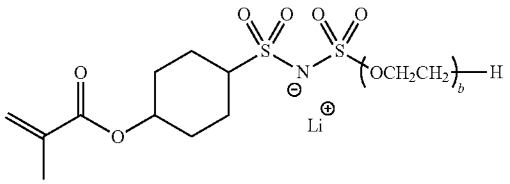

Structural Formula 76

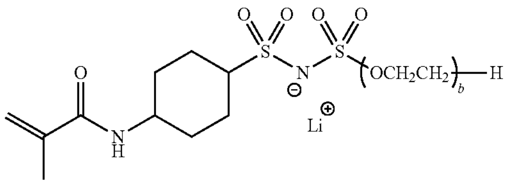

Structural Formula 77

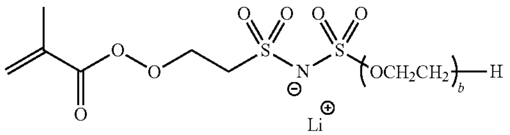

Structural Formula 78

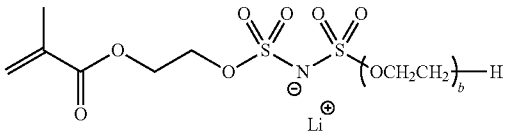

Structural Formula 79

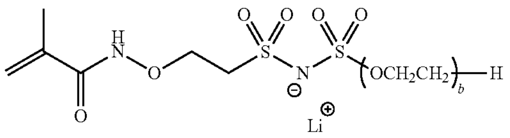

Structural Formula 80

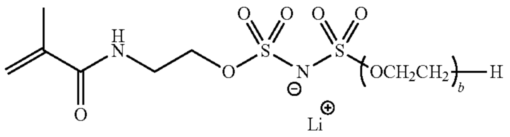

Structural Formula 81

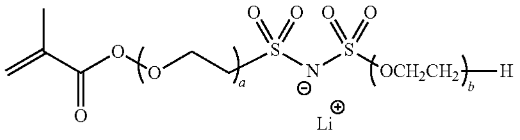

-continued

Structural Formula 82

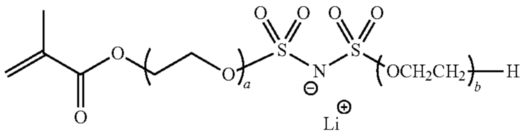

Structural Formula 83

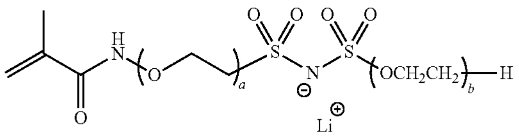

Structural Formula 84

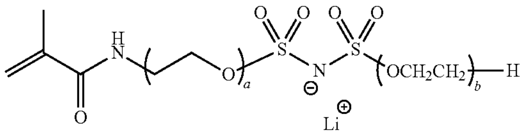

Structural Formula 85

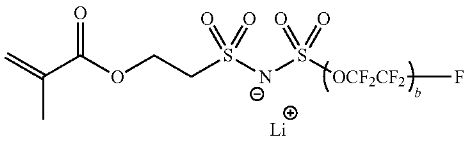

Structural Formula 86

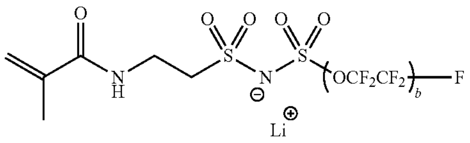

Structural Formula 87

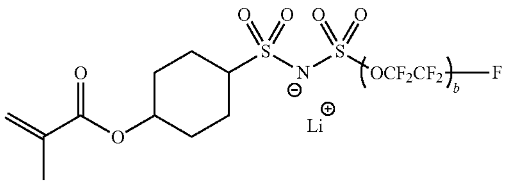

Structural Formula 88

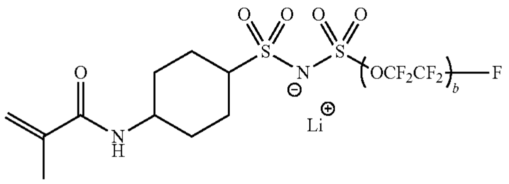

Structural Formula 89

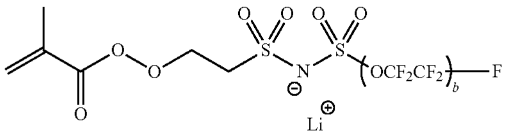

Structural Formula 90

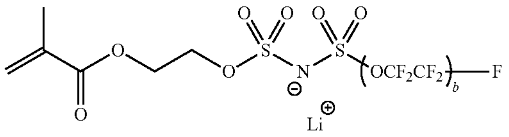

-continued

Structural Formula 91

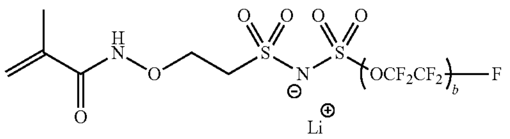

Structural Formula 92

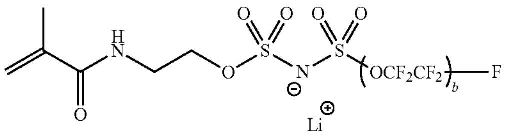

Structural Formula 93

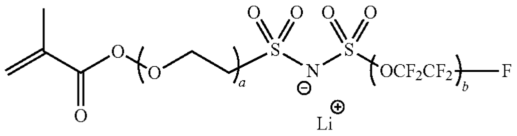

Structural Formula 94

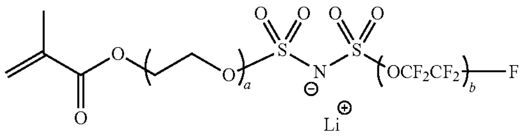

Structural Formula 95

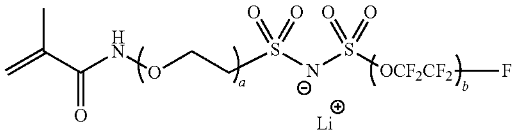

Structural Formula 96

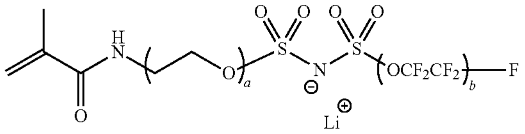

Structural Formula 97

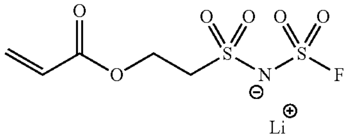

Structural Formula 98

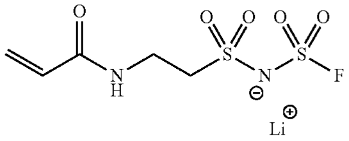

Structural Formula 99

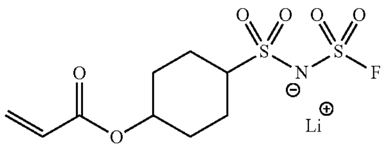

-continued

Structural Formula 100

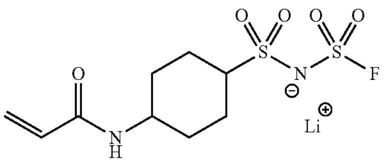

Structural Formula 101

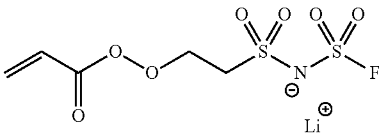

Structural Formula 102

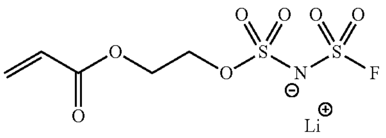

Structural Formula 103

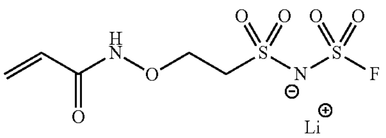

Structural Formula 104

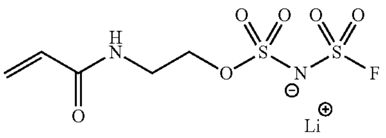

Structural Formula 105

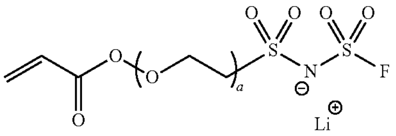

Structural Formula 106

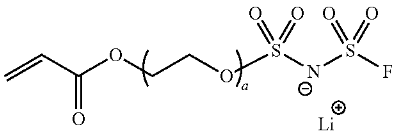

Structural Formula 107

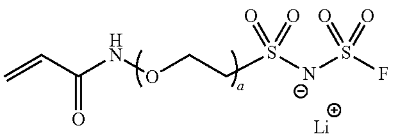

Structural Formula 108

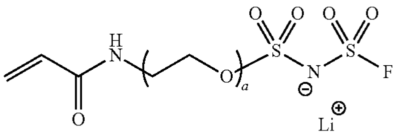

-continued

Structural Formula 109

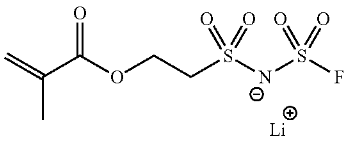

Structural Formula 110

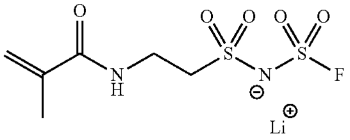

Structural Formula 111

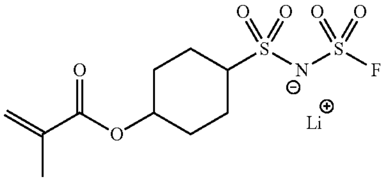

Structural Formula 112

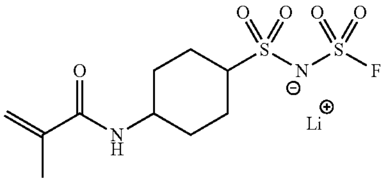

Structural Formula 113

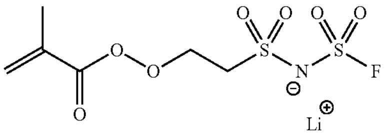

Structural Formula 114

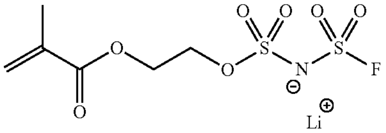

Structural Formula 115

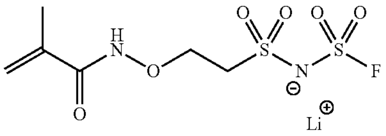

Structural Formula 116

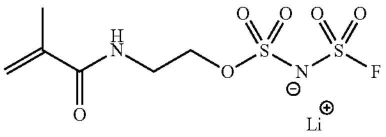

Structural Formula 117

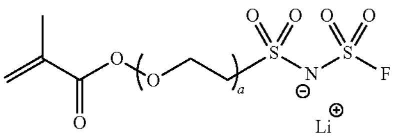

-continued

Structural Formula 118

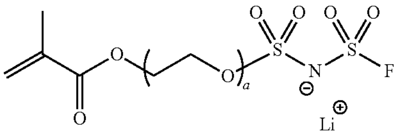

Structural Formula 119

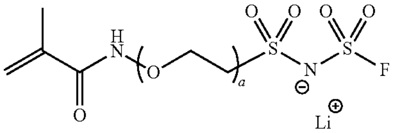

Structural Formula 120

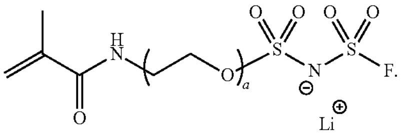

4. An electrolyte composition for a lithium secondary battery, comprising:

a non-aqueous organic solvent;

a lithium salt; and a compound represented by Formula 1:

[Formula 1]

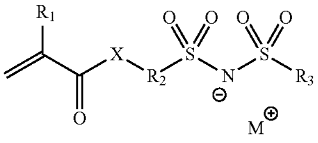

wherein, $R_1$ is hydrogen or an alkyl group having 1 to 4 carbon atoms, $R_2$ includes one or more selected from an alkylene group having 1 to 10 carbon atoms, an oxyalkylene group having 1 to 10 carbon atoms, a cycloalkylene group having 5 to 10 carbon atoms, or

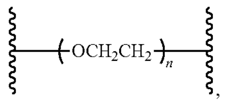

each of which is are optionally substituted with a fluorine atom, $R_3$ is a fluoro group, an alkyl group having 1 to 10 carbon atoms optionally substituted with a fluorine atom, an alkoxy group having 1 to 10 carbon atoms optionally substituted with a fluorine atom, or

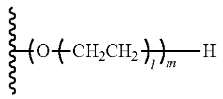

optionally substituted with a fluorine atom, provided when $R_2$ is an alkylene group having 1 to 10 carbon atoms, $R_3$ is not an alkyl group having 1 to 10 carbon atoms substituted with a fluorine atom, X is an oxygen atom (O) or —$NR_4$, $R_4$ is hydrogen or an alkyl group having 1 to 4 carbon atoms, M comprises one or more selected from the group consisting of one or more selected from the group consisting of lithium, sodium, potassium, tetraalkyl ammonium having 1 to 4 carbon atoms, and tetraalkyl phosphonium having 1 to 4 carbon atoms, l is an integer of 1 to 6, and each of m and n is an integer of 2 to 20.

5. The electrolyte composition of claim 4, wherein the compound represented by Formula 1 is present in an amount of 0.01 to 3 wt % with respect to the total weight of the electrolyte composition.

6. The electrolyte composition of claim 4, wherein the lithium salt comprises one or more of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, or $(FSO_2)_2NLi$.

7. The electrolyte composition of claim 4, wherein the non-aqueous organic solvent comprises one or more of N-methyl-2-pyrrolidinone, ethylene carbonate, propylene carbonate, butylene carbonate, dimethyl carbonate, diethyl carbonate, γ-butyrolactone, 1,2-dimethyoxy ethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl citrate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, or ethyl propionate.

8. A lithium secondary battery, comprising:

an electrode assembly having a positive electrode, a negative electrode, and a separator interposed between the positive electrode and the negative electrode, and the electrolyte of claim 4, wherein the positive electrode comprises one or more positive electrode active materials of lithium metal oxides represented by Formulas 2 or 3:

$$Li_x[Ni_yCO_2Mn_wM^1_v]O_2 \quad \text{[Formula 2]}$$

$$LiM^2_pMn_{(2-p)}O_4 \quad \text{[Formula 3]}$$

In Formulas 2 and 3, $M^1$ is one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w and v satisfy $1.0 \le x \le 1.30$, $0.5 \le y < 1$, $0 < z \le 0.3$, $0 < w \le 0.3$, and $0 \le v \le 0.1$, respectively, wherein $y+z+w+v=1$, $M^2$ is Ni, Co or Fe, and p is $0.05 \le p \le 0.6$.

9. The secondary battery of claim 8, wherein the positive electrode active material comprises one or more of $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, and or $LiNi_{0.5}Mn_{1.5}O_4$.

10. The secondary battery of claim 8, wherein the negative electrode active material comprises a carbon material and a silicon material, and the silicon material comprises one or more of silicon (Si), silicon carbide (SiC) or silicon oxide ($SiO_q$, $0.8 \le q \le 2.5$).

11. The secondary battery of claim 10, wherein the silicon material is present in an amount of 1 to 20 wt % with respect to the total weight of the negative electrode active material.

* * * * *